United States Patent
Wu et al.

(10) Patent No.: US 11,979,932 B2
(45) Date of Patent: May 7, 2024

(54) RADIO LINK MAINTENANCE FOR SIDELINK WIRELESS COMMUNICATIONS

(71) Applicant: QUALCOMM Incorporated, San Diego, CA (US)

(72) Inventors: Zhibin Wu, Los Altos, CA (US); Kapil Gulati, Hillsborough, NJ (US); Hong Cheng, Bridgewater, NJ (US); Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/866,493

(22) Filed: May 4, 2020

(65) Prior Publication Data

US 2020/0359445 A1 Nov. 12, 2020

Related U.S. Application Data

(60) Provisional application No. 62/846,486, filed on May 10, 2019.

(51) Int. Cl.
*H04W 76/25* (2018.01)
*H04B 7/06* (2006.01)
*H04L 5/00* (2006.01)
*H04W 24/10* (2009.01)
(Continued)

(52) U.S. Cl.
CPC .......... *H04W 76/25* (2018.02); *H04B 7/0626* (2013.01); *H04L 5/0051* (2013.01); *H04W 24/10* (2013.01); *H04W 80/08* (2013.01); *H04W 92/18* (2013.01)

(58) Field of Classification Search
None
See application file for complete search history.

(56) References Cited

U.S. PATENT DOCUMENTS

| 2018/0213588 | A1* | 7/2018 | Wei ................. H04W 48/08 |
| 2019/0082438 | A1 | 3/2019 | John Wilson et al. |
| 2019/0082471 | A1 | 3/2019 | Tsai et al. |

FOREIGN PATENT DOCUMENTS

| WO | WO-2018125686 A2 * | 7/2018 | ............ H04W 12/06 |
| WO | WO-2018228127 A1 * | 12/2018 | ............ H04W 24/10 |

OTHER PUBLICATIONS

Report of email discussion, 3GPP TSG-RAN, Feb. 25-Mar. 1, 2019, R2-1901705 (Year: 2019).*

(Continued)

*Primary Examiner* — Yemane Mesfin
*Assistant Examiner* — Jeff Banthrongsack
(74) *Attorney, Agent, or Firm* — Holland & Hart LLP

(57) ABSTRACT

Methods, systems, and devices for sidelink wireless communications are described in which a user equipment (UE) engaged in sidelink communications may provide for radio link maintenance of the sidelink connection by initiating a maintenance procedure, such as a measurement procedure, when one or more conditions are detected. The one or more conditions may include a threshold time being exceeded since a data transmission via the sidelink connection, or a threshold time being exceeded since a successful reception of a sidelink transmission from another UE. An access stratum layer at the initiating UE may format a data packet in the absence of higher layer data to be transmitted via the sidelink connection to initiate the maintenance procedure.

27 Claims, 16 Drawing Sheets

(51) Int. Cl.
 *H04W 80/08* (2009.01)
 *H04W 92/18* (2009.01)

(56) References Cited

OTHER PUBLICATIONS

Ericsson (Rapporteur): "Report of Email Discussion [104#57] [NR/V2X] Interface Selection", 3GPP Draft, R2-1901705, Report of Email Discussion [104#57] [NR/V2X] Interface Selection V4, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 25, 2019-Mar. 1, 2019, Feb. 14, 2019 (Feb. 14, 2019), XP051603057, 35 pages, Retrieved from the Internet: URL: http://www.3gpp.org/ftp/tsg%5Fran/WG2%5FRL2/TSGR2%5F105/Docs/R2%2D1901705%2Ezi p. [retrieved on Feb. 14, 2019] p. 14. paragraph 1—p. 28. paragraph 3.
International Search Report and Written Opinion—PCT/US2020/031503—ISA/EPO—dated Aug. 25, 2020.
ITRI: "Resource A Location for NR Sidelink Mode 2", 3GPP Draft, R1-1907232, 3rd Generation Partnership Project (3GPP), Mobile Competence Centre, 650, Route Des Lucioles, F-06921 Sophia-Antipolis Cedex, France, vol. RAN WG1, No. Reno. USA, May 13, 2019-May 17, 2019, May 3, 2019 (May 3, 2019), XP051709258, 6 pages, Retrieved from the Internet: URL: http://www.3gpp.org/ftp/tsg%5Fran/WG1%5FRL1/TSGR1%5F97/Docs/R1%2D1907232%2Ezip. [retrieved on May 3, 2019] the whole document.

\* cited by examiner

RADIO LINK MAINTENANCE FOR SIDELINK WIRELESS COMMUNICATIONS

CROSS REFERENCE

The present application for patent claims the benefit of U.S. Provisional Patent Application No. 62/846,486 by WU et al., entitled "RADIO LINK MAINTENANCE FOR SIDELINK UNICAST WIRELESS COMMUNICATIONS," filed May 10, 2019, assigned to the assignee hereof, and expressly incorporated by reference herein.

BACKGROUND

The following relates generally to wireless communications, and more specifically to radio link maintenance for sidelink wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless communications systems may support direct communications between communications devices (e.g., direct communications between multiple UEs), which may be referred to herein as "sidelink" communications. Examples of sidelink communications may include, but are not limited to, device-to-device (D2D) communications, proximity services (ProSe) communications, vehicle-based communications, which may also be referred to as vehicle-to-everything (V2X) communications systems, vehicle-to-vehicle (V2V) communications systems, cellular V2X (C-V2X) communications systems, and the like. Some wireless communications systems, such as LTE systems, LTE-A systems, or LTE-A Pro systems, 5G systems, and V2X systems may support a procedure for establishing a connection between multiple UEs. The procedure may involve a series of handshake messages exchanged between the multiple UEs. In order to maintain the connection between UEs, measurements may be made on transmissions between UEs (e.g., channel quality or channel state measurements) and one or more transmission parameters adjusted based on such measurements to maintain link quality. Efficient channel measurements for direct communications connections between UEs may be beneficial in order to enhance system reliability and throughput.

SUMMARY

The described techniques relate to improved methods, systems, devices, and apparatuses that support radio link maintenance for sidelink wireless communications. Various aspects of the disclosure provide for maintenance of a sidelink communications connection between a first user equipment (UE) and a second UE. In some cases, an initiating UE may determine that a measurement of the sidelink connection is to be initiated (e.g., to maintain link quality of the sidelink connection). In some cases, the determination may be based on an amount of time since a data transmission via the sidelink connection exceeding a threshold. In other cases, the determination may be based on a sidelink transmission from the other UE not being successfully received for a time period exceeding the threshold.

In some cases, an access stratum (AS) layer at the initiating UE may format a data packet (e.g., a dummy data packet) in the absence of higher layer data to be transmitted to the other UE. The AS layer may provide the data packet to a lower layer (e.g., a physical layer) for insertion of one or more reference signals and transmission to the other UE over the sidelink connection. A UE that receives such a data packet may initiate a measurement procedure that helps maintain the sidelink connection. In some cases, the measurement procedure may be a measurement of a reference signal (e.g., a channel state information reference signal (CSI-RS)) transmitted with the data packet. In some cases, the measurement procedure may be a beam sweeping procedure used to maintain or modify a beam pair link between UEs using beamformed communications. In some cases, additionally or alternatively, an initiating UE may transmit a signal solicit the other UE to transmit a data packet at the AS layer for measurement at the initiating UE.

A method of wireless communication at a first UE is described. The method may include establishing, at the first UE, a sidelink connection with a second UE, detecting, based on a status timer at an access stratum layer of the first UE, that a gap in communications with the second UE via the sidelink connection exceeds a threshold time, and initiating, at the access stratum layer, a link maintenance procedure to maintain the sidelink connection with the second UE.

An apparatus for wireless communication at a first UE is described. The apparatus may include a processor, memory in electronic communication with the processor, and instructions stored in the memory. The instructions may be executable by the processor to cause the apparatus to establish, at the first UE, a sidelink connection with a second UE, detect, based on a status timer at an access stratum layer of the first UE, that a gap in communications with the second UE via the sidelink connection exceeds a threshold time, and initiate, at the access stratum layer, a link maintenance procedure to maintain the sidelink connection with the second UE.

Another apparatus for wireless communication at a first UE is described. The apparatus may include means for establishing, at the first UE, a sidelink connection with a second UE, detecting, based on a status timer at an access stratum layer of the first UE, that a gap in communications with the second UE via the sidelink connection exceeds a threshold time, and initiating, at the access stratum layer, a link maintenance procedure to maintain the sidelink connection with the second UE.

A non-transitory computer-readable medium storing code for wireless communication at a first UE is described. The code may include instructions executable by a processor to establish, at the first UE, a sidelink connection with a second UE, detect, based on a status timer at an access stratum layer of the first UE, that a gap in communications with the second UE via the sidelink connection exceeds a threshold time, and initiate, at the access stratum layer, a link maintenance procedure to maintain the sidelink connection with the second UE.

In some examples of the method, apparatuses, and non-transitory computer-readable medium described herein, the link maintenance procedure may include a measurement procedure to measure one or more channel characteristics of the sidelink connection with the second UE.

In some examples of the method, apparatuses, and non-transitory computer-readable medium described herein, the detecting further may include operations, features, means, or instructions for determining that data traffic of the sidelink connection has been inactive for at least the threshold time.

In some examples of the method, apparatuses, and non-transitory computer-readable medium described herein, the detecting further may include operations, features, means, or instructions for determining that a signal from the second UE via the sidelink connection has not been successfully received for at least the threshold time.

Some examples of the method, apparatuses, and non-transitory computer-readable medium described herein may further include operations, features, means, or instructions for formatting, responsive to the initiating, a data packet at the access stratum layer for transmission to the second UE, providing the data packet to a lower layer for insertion of one or more reference signals, and transmitting the data packet and one or more reference signals to the second UE over the sidelink connection. Some examples of the method, apparatuses, and non-transitory computer-readable medium described herein may further include operations, features, means, or instructions for receiving, from the second UE, a measurement report based on the one or more reference signals. In some examples of the method, apparatuses, and non-transitory computer-readable medium described herein, the formatting the data packet further may include operations, features, means, or instructions for formatting an access stratum layer dummy packet independently of input from one or more higher layers.

In some examples of the method, apparatuses, and non-transitory computer-readable medium described herein, the initiating the link maintenance procedure further may include operations, features, means, or instructions for transmitting a signal to solicit the second UE to transmit a data packet at the access stratum layer for measurement at the first UE.

In some examples of the method, apparatuses, and non-transitory computer-readable medium described herein, the initiating the link maintenance procedure further may include operations, features, means, or instructions for transmitting an indication to a lower layer to transmit a reference signal transmission to the second UE. In some examples of the method, apparatuses, and non-transitory computer-readable medium described herein, the reference signal transmission to the second UE may be a channel state information reference signal (CSI-RS) transmission using only reference signal symbols.

In some examples of the method, apparatuses, and non-transitory computer-readable medium described herein, the initiating the link maintenance procedure further may include operations, features, means, or instructions for triggering a beam sweep procedure to align one or more transmission beams between the first UE and the second UE and form a beam pair link. Some examples of the method, apparatuses, and non-transitory computer-readable medium described herein may further include operations, features, means, or instructions for transmitting two or more reference signals using two or more different transmission beams to the second UE, receiving one or more response transmissions from the second UE via one or more receive beams, and determining the beam pair link based on the one or more response transmissions.

Some examples of the method, apparatuses, and non-transitory computer-readable medium described herein may further include operations, features, means, or instructions for repeating the measurement procedure to measure one or more channel characteristics of the sidelink connection with the second UE according to a predetermined periodicity, identifying, at the access stratum layer, new data traffic for the sidelink connection with the second UE, and discontinuing the measurement procedure.

Some examples of the method, apparatuses, and non-transitory computer-readable medium described herein may further include operations, features, means, or instructions for receiving one or more of a radio resource control message, a medium access control (MAC) control element, or any combinations thereof, that configures the link maintenance procedure.

Some examples of the method, apparatuses, and non-transitory computer-readable medium described herein may further include operations, features, means, or instructions for transmitting, responsive to initiating the link maintenance procedure, a sidelink reference signal to the second UE for sidelink measurements according to the link maintenance procedure.

In some examples of the method, apparatuses, and non-transitory computer-readable medium described herein, the establishing the sidelink connection further may include operations, features, means, or instructions for transmitting an indication to the second UE that the first UE is configured to trigger the link maintenance procedure for both the first UE and the second UE. In some examples of the method, apparatuses, and non-transitory computer-readable medium described herein, each of the first UE and the second UE independently trigger the link maintenance procedure based on data traffic communications via the sidelink connection. In some examples of the method, apparatuses, and non-transitory computer-readable medium described herein, the sidelink connection with the second UE may be a unicast sidelink connection.

A method of wireless communication at a second UE is described. The method may include establishing, at the second UE, a sidelink connection with a first UE, receiving, from the first UE, a link maintenance procedure message via the sidelink connection to initiate a link maintenance procedure, where the link maintenance procedure message is received in an absence of sidelink data communications via the sidelink connection, and initiating the link maintenance procedure based on the link maintenance procedure message.

An apparatus for wireless communication at a second UE is described. The apparatus may include a processor, memory in electronic communication with the processor, and instructions stored in the memory. The instructions may be executable by the processor to cause the apparatus to establish, at the second UE, a sidelink connection with a first UE, receive, from the first UE, a link maintenance procedure message via the sidelink connection to initiate a link maintenance procedure, where the link maintenance procedure message is received in an absence of sidelink data communications via the sidelink connection, and initiate the link maintenance procedure message.

Another apparatus for wireless communication at a second UE is described. The apparatus may include means for establishing, at the second UE, a sidelink connection with a first UE, receiving, from the first UE, a link maintenance procedure message via the sidelink connection to initiate a link maintenance procedure, where the link maintenance procedure message is received in an absence of sidelink data communications via the sidelink connection, and initiating the link maintenance procedure based on the measurement procedure message.

A non-transitory computer-readable medium storing code for wireless communication at a second UE is described. The code may include instructions executable by a processor to establish, at the second UE, a sidelink connection with a first UE, receive, from the first UE, a link maintenance procedure message via the sidelink connection to initiate a link maintenance procedure, where the link maintenance procedure message is received in an absence of sidelink data communications via the sidelink connection, and initiate the link maintenance procedure based on the measurement procedure message.

Some examples of the method, apparatuses, and non-transitory computer-readable medium described herein may further include operations, features, means, or instructions for measuring one or more channel characteristics based on one or more reference signals of the link maintenance procedure message, and transmitting, to the first UE, a measurement report indicating the one or more channel characteristics.

Some examples of the method, apparatuses, and non-transitory computer-readable medium described herein may further include operations, features, means, or instructions for formatting, responsive to the initiating, a data packet at the access stratum layer for transmission to the first UE, providing the data packet to a lower layer for insertion of one or more reference signals, and transmitting the data packet and one or more reference signals to the first UE over the sidelink connection.

In some examples of the method, apparatuses, and non-transitory computer-readable medium described herein, the receiving the link maintenance procedure message further may include operations, features, means, or instructions for receiving, at an access stratum layer of the second UE, a dummy packet from the first UE that does not contain data that is to be provided to one or more higher layers, and determining, based on the dummy packet, to initiate the link maintenance procedure to measure one or more channel characteristics of the sidelink connection. In some examples of the method, apparatuses, and non-transitory computer-readable medium described herein, the link maintenance procedure message includes a channel state information reference signal (CSI-RS) transmission using only reference signal symbols.

Some examples of the method, apparatuses, and non-transitory computer-readable medium described herein may further include operations, features, means, or instructions for initiating, responsive to receiving the link maintenance procedure message, a beam sweep procedure to align one or more transmission beams between the first UE and the second UE and form a beam pair link. Some examples of the method, apparatuses, and non-transitory computer-readable medium described herein may further include operations, features, means, or instructions for receiving two or more reference signals using two or more different transmission beams from the first UE, measuring one or more channel characteristics of each of the two or more different transmission beams, and transmitting a measurement report to the first UE that indicates a preferred transmission beam for the beam pair link.

Some examples of the method, apparatuses, and non-transitory computer-readable medium described herein may further include operations, features, means, or instructions for monitoring for link maintenance procedure messages from the first UE according to a predetermined periodicity, identifying new data traffic for the sidelink connection with the first UE, and discontinuing the monitoring for the link maintenance procedure messages.

In some examples of the method, apparatuses, and non-transitory computer-readable medium described herein, the link maintenance procedure message from the first UE includes one or more reference signals, and where the one or more reference signals include a sidelink reference signal for sidelink measurements according to a sidelink measurement procedure.

In some examples of the method, apparatuses, and non-transitory computer-readable medium described herein, the establishing the sidelink connection further may include operations, features, means, or instructions for receiving an indication from the first UE that the first UE may be configured to trigger the link maintenance procedure for both the first UE and the second UE. In some examples of the method, apparatuses, and non-transitory computer-readable medium described herein, each of the first UE and the second UE independently trigger the link maintenance procedure based on data traffic communications via the sidelink connection. In some examples of the method, apparatuses, and non-transitory computer-readable medium described herein, the sidelink connection with a first UE may be a unicast sidelink connection.

DETAILED DESCRIPTION

Figure 1:
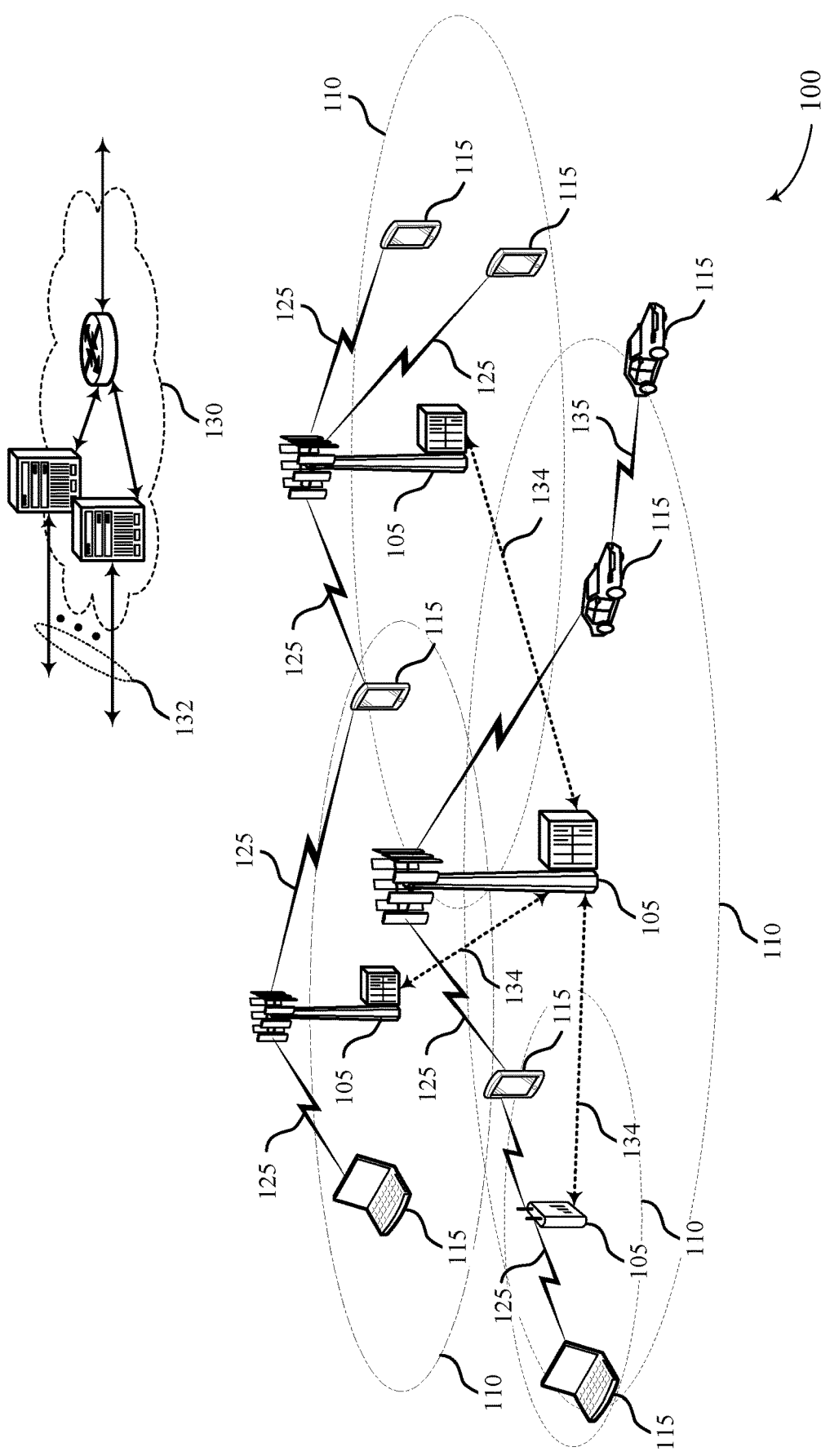
FIG. 1 illustrates an example of a system for wireless communications that supports radio link maintenance for sidelink wireless communications in accordance with aspects of the present disclosure.

Various aspects of the present disclosure describe techniques provide for communication devices using direct sidelink communications (e.g., vehicle-based communications such as V2X communications systems, V2V communications systems, C-V2X communications systems, and the like) to maintain link quality through triggering one or more link maintenance procedures based on certain conditions. In some cases, the sidelink communications may be unicast sidelink communications between communication devices that may be setup via a PC5 interface between a first user equipment (UE) and a second UE. In some cases, the link maintenance procedures may be triggered based on a timer (e.g., based on an amount of time since a data traffic transmission exceeding a threshold time, based on not successfully receiving a communication from the other UE for the threshold time, and the like). In some cases the link maintenance procedures may be triggered based on UE movement (e.g., when a vehicle movement exceeds a movement threshold).

As indicated, in some cases the sidelink communications may be established via the PC5 interface, which may facilitate direct communications between at least two UEs without involving a network infrastructure (e.g., a base station (e.g., an eNodeB (eNB), a next-generation NodeB or giga-NodeB (either of which may be referred to as a gNB), and the like). The PC5 interface may also be a one-to-many communication interface (i.e., may be specified for group communications). The PC5 interface, while facilitating direct communications between devices, does not provide for radio link maintenance, as there is no mechanism to measure the status of unicast link if there is no sidelink traffic transported (e.g., there are no periodic reference signal transmissions such as transmitted by a base station in the absence of data traffic in an NR or LTE system). Thus, techniques as discussed herein may provide for link maintenance in the absence data traffic to be transported via the sidelink connection. While various examples discussed herein use a PC5 interface, techniques as discussed herein may be used in any system where communications devices such as UEs may establish direct connections.

In some cases, an initiating UE may determine that a measurement of the sidelink connection is to be initiated (e.g., to maintain link quality of the sidelink connection). Such a determination may be based on an amount of time since a data transmission via the sidelink connection exceeding a threshold. In other cases, the determination may be based on a sidelink transmission from the other UE not being successfully received for a time period exceeding the threshold, or may be based on a movement or acceleration change of the UE (e.g., acceleration or movement of a vehicle that maintains the sidelink connection).

In some cases, an access stratum (AS) layer at the initiating UE may format a data packet (e.g., a dummy data packet) in the absence of higher layer data to be transmitted to the other UE. The AS layer may provide the data packet to a lower layer (e.g., a physical layer) for insertion of one or more reference signals and transmission to the other UE over the sidelink connection. A UE that receives such a data packet may initiate a measurement procedure that helps maintain the sidelink connection. In some cases, the measurement procedure may be a measurement of a reference signal (e.g., a channel state information reference signal (CSI-RS)) transmitted with the data packet. In some cases, the measurement procedure may be a beam sweeping procedure used to maintain or modify a beam pair link between UEs using beamformed communications. In some cases, additionally or alternatively, an initiating UE may transmit a signal solicit the other UE to transmit a data packet at the AS layer for measurement at the initiating UE.

Techniques as discussed herein may thus provide a special mechanism for the AS layer to maintain a sidelink connection (e.g., a PC5 radio link) when there is no data traffic. Further, such techniques, in some cases, may allow the AS layer at a receiving UE to know that there will be no traffic from the initiating UE, the that the receiving UE just needs to follow the configurations on RLM measurement (e.g., a periodicity of link measurements, such as CSI-RS on the link for CSI reporting, and the like). Therefore aspects of the disclosure may provide enhancements to the operation of UEs supporting direct communications, such as a D2D sidelink communications system, a V2X communications system, and the like. For example, by enabling UEs to trigger measurement procedures, link quality between UEs may be maintained, which can enhance reliability of communications. Further, by enhancing link reliability, UEs in direct communications (e.g., in V2X sidelink communications) may support low end-to-end (E2E) latency and ultra-high reliability. This in return may benefit direct communications systems (e.g., V2X communications systems), for example, where conveying important information to or from vehicles regarding inclement weather, nearby accidents, road conditions, and/or the activities of nearby vehicles may demand low E2E latency and ultra-high reliability.

Aspects of the disclosure are initially described in the context of a wireless communications system. Additional wireless communications systems and process flows are then provided to illustrate aspects of the disclosure. Aspects of the disclosure are further illustrated by and described with reference to apparatus diagrams, system diagrams, and flowcharts that relate to radio link maintenance for sidelink wireless communications.

FIG. 1 illustrates an example of a wireless communications system 100 that supports radio link maintenance for sidelink wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol) via sidelink connection 135. One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105 (e.g., via a PC5 interface).

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a transmitting device (e.g., a base station 105 or UE 115) may use multiple antennas or antenna arrays to conduct beamforming operations for directional communications with a receiving device (e.g., a UE 115). For instance, some signals (e.g. synchronization signals, reference signals, beam selection signals, or other control signals) may be transmitted multiple times in different directions by the transmitting device, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the transmitting device.

Some signals, such as data signals associated with a particular receiving device, may be transmitted in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the transmitting device in different directions, and the UE 115 may report to the transmitting device an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the transmitting device, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In some cases, a non-access stratum (NAS) layer may provide channel data to an access stratum (AS) layer for transmission via one or more physical channels. The AS layer may include a radio resource control (RRC) layer that provides establishment, configuration, and maintenance of an RRC connection between a UE 115 and another UE 115, a base station 105, or core network 130 supporting radio bearers for user plane data. The AS layer may also include a bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. At the Physical layer, transport channels may be mapped to physical channels.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

In accordance with various aspects of the disclosure, a UE 115 engaged in sidelink communications (e.g., via sidelink connection 135) may provide for maintenance of the sidelink connection 135 when one or more conditions are detected. In some cases a UE 115 initiating the link maintenance procedure may determine that a measurement of the sidelink connection 135 is to be initiated (e.g., to maintain link quality) based on a threshold time being exceeded since a data transmission via the sidelink connection 135. In other cases, the link maintenance procedure may be initiated based on a sidelink transmission from another UE 115 not being successfully received for a time period exceeding the threshold time.

In some cases, an AS layer at the initiating UE 115 may format a data packet (e.g., a dummy data packet) in the absence of higher layer data to be transmitted via the sidelink connection 135. The AS layer may provide the data packet to a lower layer (e.g., a physical layer) for insertion of one or more reference signals and transmission. A UE 115 that receives such a data packet may initiate a measurement procedure that helps maintain the sidelink connection.

Figure 2:
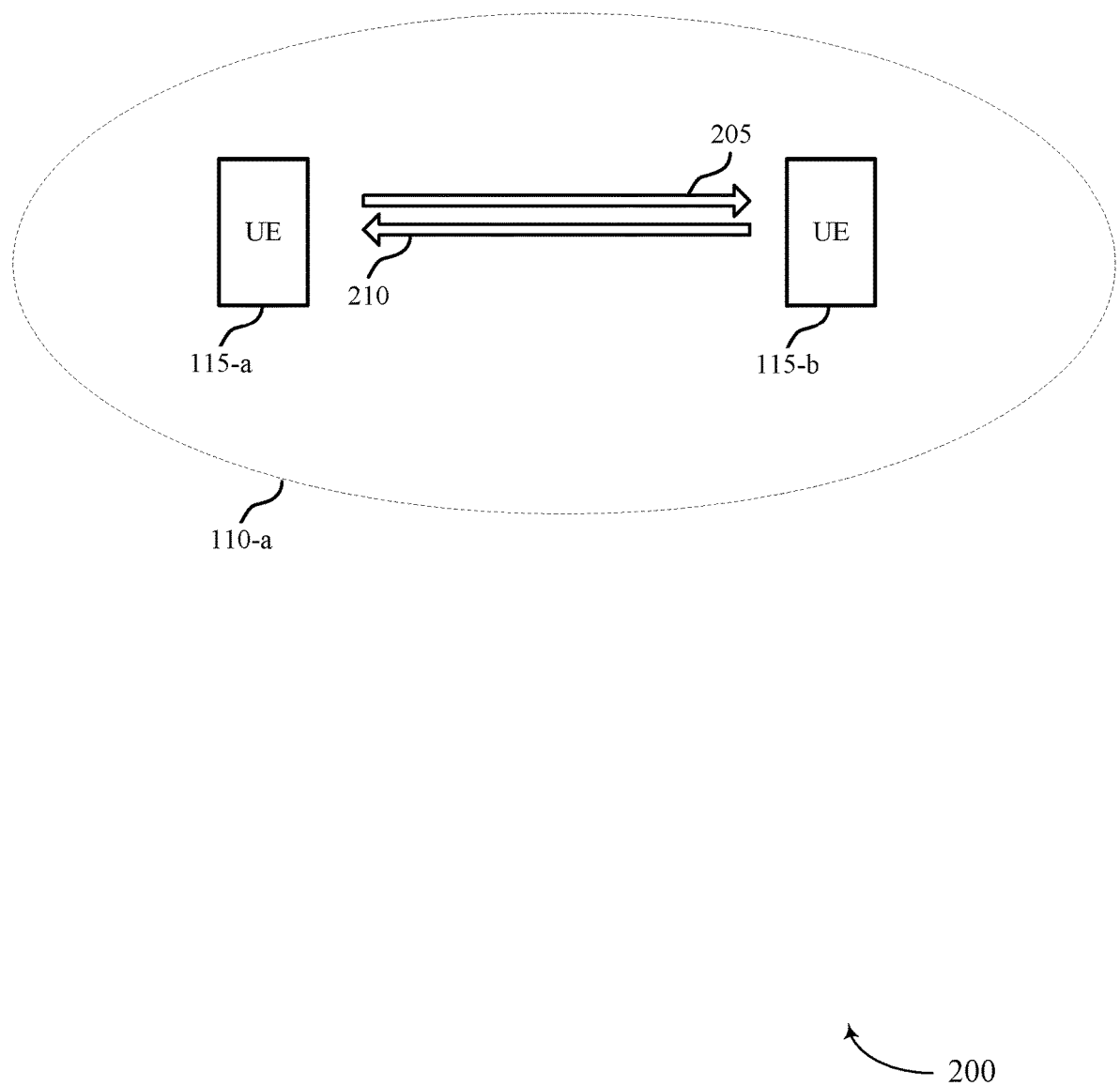
FIG. 2 illustrates an example of a portion of a wireless communications system that supports radio link maintenance for sidelink wireless communications in accordance with aspects of the present disclosure.

FIG. 2 illustrates an example of a wireless communications system 200 that supports radio link maintenance for sidelink wireless communications in accordance with aspects of the present disclosure. In some examples, wireless communications system 200 may implement aspects of wireless communications system 100. The wireless communications system 200 may include a first UE 115-a and a second UE 115-b, which may be examples of the corresponding devices described with reference to FIG. 1.

As described herein, the first UE 115-a may establish a sidelink connection (e.g., a unicast connection) with the second UE 115-b. In some examples, the wireless communications system 200 may support sidelink, broadcast, groupcast, and unicast transmission for any UEs that are in-coverage, out-of-coverage, or in partial-coverage, or a combination thereof. By way of example, the first UE 115-a and the second UE 115-b may be vehicles, where the connection over the sidelink may be a V2X communication link between the first UE 115-a (e.g., a first vehicle) and the second UE 115-b (e.g., a second vehicle). Additionally or alternatively, the connection over the sidelink may generally be used for sidelink communications between the first UE 115-a and the second UE 115-b. In some examples, the first UE 115-a may be referred to as an initiating UE that initiates a measurement procedure to maintain the sidelink connection (e.g., a unicast connection), and the second UE 115-b may be referred to as a receiving UE that is targeted for the connection by the first UE 115-a.

As part of establishing the sidelink connection, the first UE 115-a and the second UE 115-b may exchange communications related to the connection via a PC5 interface. The PC5 interface may be a one-to-many communication interface, which may be reflected in the assignment of one or more identifiers (e.g., one or more UE identifiers). In some examples, a security association may be established between the first UE 115-a and the second UE 115-b for the sidelink connection based in part on the identifier(s). The identifier(s) may indicate which UE is transmitting which message and/or which UE the message is intended for. As such, traffic (e.g., unicast traffic) may benefit from security protection at a link level (e.g., Integrity Protection). Due to privacy requirements, in V2X communications systems, the first UE 115-a and the second UE 115-b may change one or more identifiers periodically in order to evade being trackable.

According to an example technique, the first UE 115-a may detect that a measurement procedure is to be initiated with the second UE 115-b. The first UE 115-a (e.g., the initiating UE) may format and transmit a data packet via a first link 205 to the second UE 115-b to initiate a measurement procedure. For example, data packet may be a dummy or empty packet formed at the AS layer of the first UE 115-a that does not contain data traffic from a higher layer but contains reference signals in configured reference signal symbols. The second UE 115-b may receive the data packet and identify that the transmission is for purposes of initiating a measurement (e.g., based on the content of the dummy packet, which may include no data and only reference signals to implicitly indicate that it is for measurement purposes, or based on a predetermined data field that explicitly indicates the packet is for measurement purposes). The second UE 115-b may, in some cases, transmit a measurement report on a second link 210 back to the first base station 105-*a* based on one or more measurements (e.g., a channel state information (CSI) report based on measurements of a CSI reference signal (CSI-RS) in the data packet).

In other cases, the measurements of the second UE 115-*b* may simply be provided to higher layers at the second UE 115-*b* for purposes of setting one or more parameters for the sidelink communications, in which case the second UE 115-*b* may not send a measurement report to the first UE 115-*a*. Additionally or alternatively, the first UE 115-*a* may transmit, via the first link 205, a signal to solicit the second UE 115-*b* to transmit a data packet at the AS layer for measurement at the first UE 115-*a*. In such cases, the second UE 115-*b* may format and transmit a packet on the second link 210 to the first UE 115-*a*.

In some cases, the first UE 115-*a* may initiate the measurement procedure based on one or more timers at the first UE 115-*a*. In some examples, the first UE 115-*a* may start and monitor an inactivity in the AS layer for the sidelink connection, and if there is no data transport (e.g., PC5 data traffic) for a time bigger than a threshold, the first UE 115-*a* may initiate the measurement procedure. In some cases the data packet that is transmitted to initiate the measurement procedure may be a relatively small dummy packet that contains a small amount of dummy or predetermined data and reference signal transmissions. In other cases, the first UE 115-*a* may be configured (e.g., via RRC configuration) to transmit only reference signals (e.g., CSI-RS), and the second UE 115-*b* may be configured to receive only reference signals in some packets. In some cases, so long as new data traffic (e.g., PC5 data traffic) is not received from a higher layer at the first UE 115-*b*, or from the second UE 115-*b* via second link 210, the first UE 115-*a* may periodically transmit such packets to maintain link quality of the first link 205 and the second link 210. When data traffic resumes, such measurements may be discontinued until there is another gap in data traffic. Additionally or alternatively, the first UE 115-*a* may initiate the measurement procedure based on one or more other criteria, such as based on not successfully receiving a communication from the second UE 115-*b* for the threshold time (or a different time period that may be configured), based on UE movement (e.g., when a vehicle acceleration or movement exceeds a movement threshold), or any combinations thereof. In an alternative example, although there may be PC5 data traffic activity from an upper layer, the first UE 115-*a* may have attempted to deliver those PC5 packets to the second UE 115-*b*, but failed to receive any positive response from the second UE 115-*b* during a time period exceeding the threshold time, or may receive a negative or error responses exceeding a threshold counter, in which case the first UE 115-*a* may also initiate the measurement procedure.

In some cases, the AS layer mechanism to initiate the measurement procedure may be realized in one or several different ways, such as through layer 3 RRC signaling (e.g., a special RRC keepalive message, a layer 2 MAC-CE, a layer 1 signal design (e.g., Sidelink SSB or other special reference signal(s)), or any combinations thereof. Further, in some cases the first UE 115-*a* and the second UE 115-*b* may determine which UE 115 is responsible to trigger the measurement procedure. In some cases, both the first UE 115-*a* and the second UE 115-*b* may trigger the measurement procedure independently (e.g., each UE 115 may trigger the measurement procedure at the other UE 115 based on one or more criteria such as discussed herein). In other cases, during the RRC connection establishment of the sidelink connection, the UEs 115 may negotiate which UE 115 is designated to trigger the measurement procedure (and thus be referred to as the first UE in accordance with various examples discussed herein).

Figure 3:
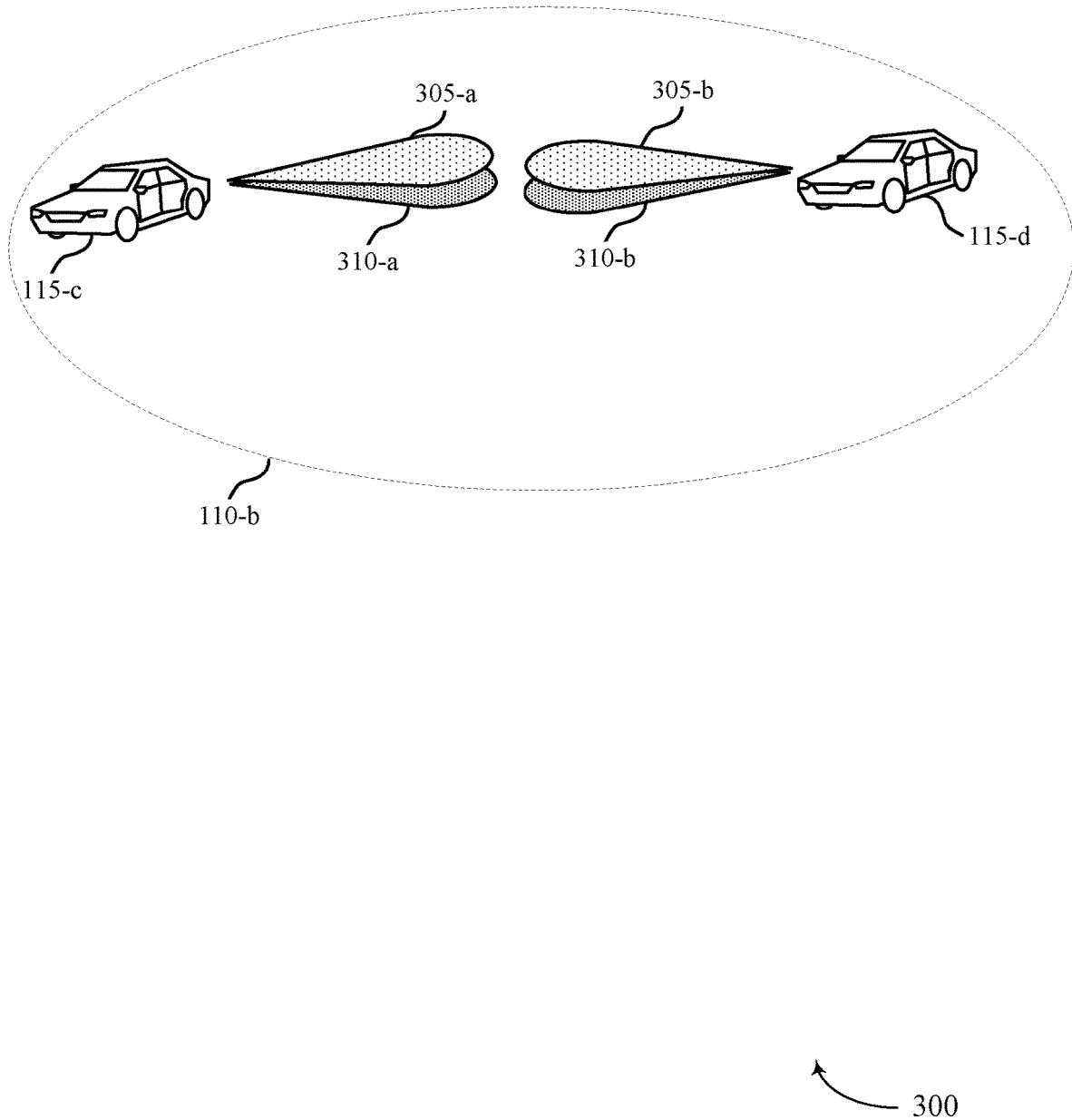
FIGS. 3 and 4 illustrate examples of process flows that support radio link maintenance for sidelink wireless communications in accordance with aspects of the present disclosure.

FIG. 3 illustrates an example of a wireless communications system 300 using beamformed communications that supports radio link maintenance for sidelink wireless communications in accordance with aspects of the present disclosure. In some examples, wireless communications system 300 using beamformed communications may implement aspects of wireless communications system 100 or 200. The wireless communications system 300 may include a first UE 115-*c* and a second UE 115-*d*, which may be examples of the corresponding devices described with reference to FIGS. 1 and 2, and in this example are illustrated as vehicles.

As described herein, the first UE 115-*c* may establish a sidelink connection (e.g., a unicast connection) with the second UE 115-*d*. In this example, beamformed communications may be used (e.g., at mmW or frequency range 2 (FR2) frequencies) in which one or more beam pair links may be established for sidelink communications. In this example, a first beam pair link may use transmission beams 305, in which a first transmit beam 305-*a* may be formed at the first UE 115-*c* and received at the second UE 115-*d*, and a second transmission beam 305-*b* may be formed at the second UE 115-*d* and received at the first UE 115-*c*. Similarly, a second beam pair link may include transmission beams 310 that operate in a similar manner.

In this example, at AS at the first UE 115-*c* and second UE 115-*d* may initiate link maintenance procedures according to one or more of the techniques discussed herein. In cases such as in FIG. 2 that establish connections via FR2, the link maintenance procedure may be a beam sweeping procedure in which the beams of a particular beam pair link may be modified or switched such that the beam pair link maintains a good or acceptable link quality. In some cases, the link maintenance procedure may initiate a limited or abridged beam sweeping procedure in which a set of selected beams having beamforming parameters relatively close to the established beam pair link(s) may be swept (e.g., by transmitting consecutive SSB transmissions from the first UE 115-*c* using the selected beams, which are measured at the second UE 115-*d*). The second UE 115-*d* may provide an indication of a preferred beam based on measurements of the measured transmissions to re-align the active beam pair link. Such a beam sweeping procedure may serve as a mechanism to reassure the health and link quality of the beamformed sidelink connection (e.g., using beam pair link procedures to keep track of the strongest beam, other alternate beams, and switch beams when needed based on CSI reports from measured SSB transmissions). In such cases, both the first UE 115-*c* and the second UE 115-*d* may perform beam sweeping operations to allow the other UE 115 to perform such measurements. Information may be exchanged between the UEs 115 that indicates the preferred beams. Thus, the link maintenance procedure in such cases may not use dummy packets, but may use, for example, predetermined beam management and beam recovery procedure signaling (e.g., beam recovery procedure signaling defined for NR Uu).

Figure 4:
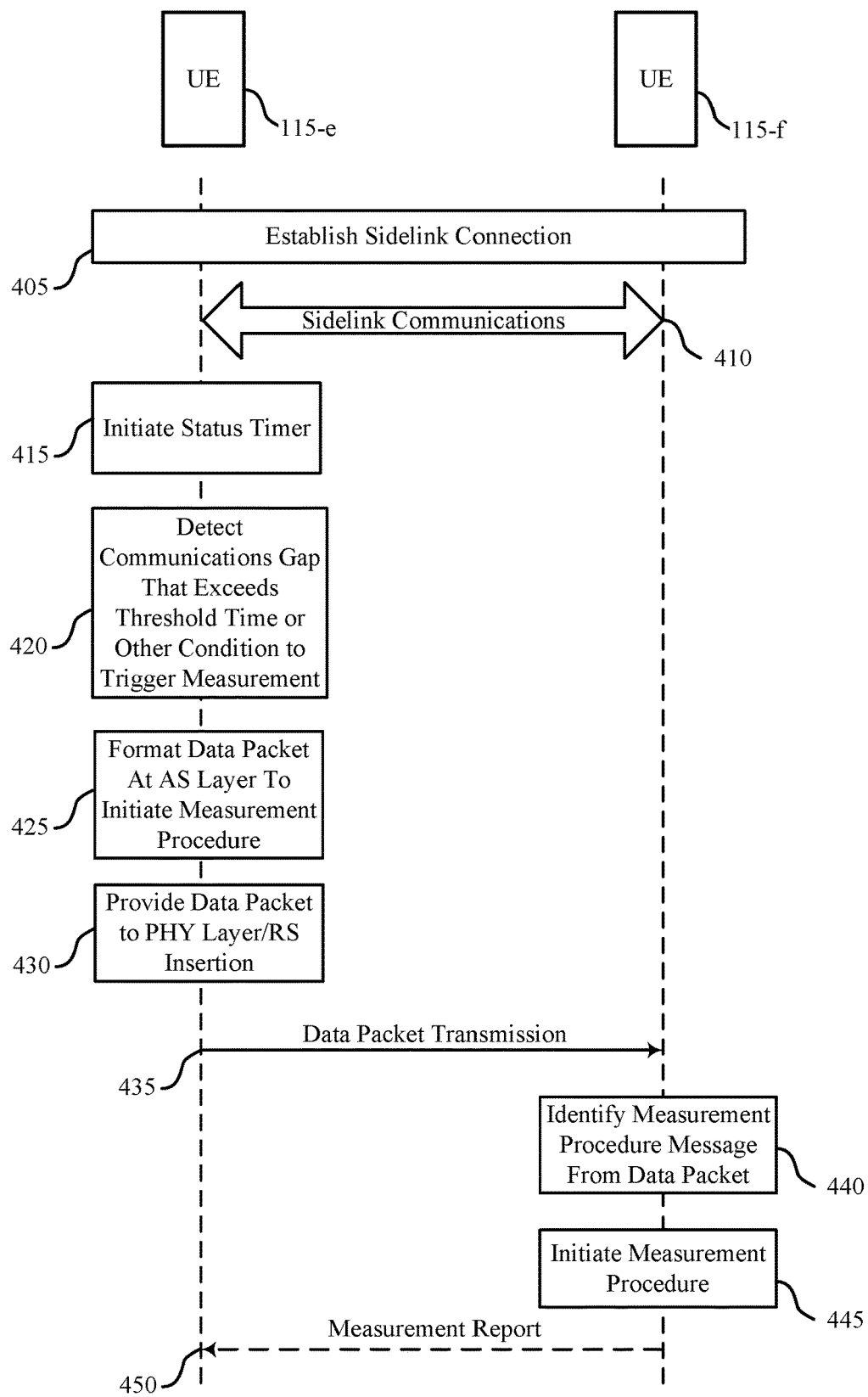

FIG. 4 illustrates an example of a process flow 400 that supports radio link maintenance for sidelink wireless communications in accordance with aspects of the present disclosure. In some examples, process flow 400 may implement aspects of wireless communications system 100, 200, or 300. The process flow 400 may include a UE 115-*e* and a UE 115-*f* which may be examples of the corresponding devices described with reference to FIGS. 1 through 3. The UE 115-*e* may be referred to as an initiating UE or first UE that initiates a link maintenance procedure such as a measurement procedure, and UE **115-*f* may be referred to as a receiving UE or second UE at which the link maintenance procedure is initiated by the first UE 115-*e***. The layer signaling procedure may be an RRC layer signaling procedure, a V2X layer signaling procedure, and/or the like.

In the following description of the process flow 400, the operations between the UE **115-*e* and the UE 115-*f* may be transmitted in a different order than the exemplary order shown, or the operations performed by the first UE 115-*e* and the second UE 115-*f* may be performed in different orders or at different times. Certain operations may also be omitted from the process flow 400, and/or other operations may be added to the process flow 400**.

At 405, the first UE **115-*e* and the second UE 115-*f* may establish a sidelink connection. The sidelink connection may be established, for example, via a PC5 interface between the first UE 115-*e* and the second UE 115-*f*. For example, the first UE 115-*f* may transmit a RRC message to the second UE 115-*f*, such as a connection request message (e.g. an RRC_SL_SETUP_REQ message) that may include a UE capability, a sidelink bearer configuration, QoS-related parameters, a Tx profile parameter, one or more measurement procedure parameters (e.g., periodicity, identity of initiating UE, beam sweeping parameters for FR2 connections, etc.), or a combination thereof. The second UE 115-*f* may transmit a response RRC message to the first UE 115-*e*** based on, for example, an evaluation of the connection request message received, that accepts or rejects the request message (e.g., a DIRECT_COMM_ACCEPT message or DIRECT_COMM_REJECT message).

At 410, the first UE **115-*e* and the second UE 115-*f* may exchange sidelink communications. For example, the PC5 interface may provide data traffic that is transmitted/received at UEs 115** using the AS layer via physical channels (e.g., via FR1 or FR2 transmissions).

At 415, the first UE **115-*e* may initiate a status timer. In some cases, the status timer may be initiated after a sidelink communications transmission to or reception from the second UE 115-*f*. In some cases, the status timer may be used to monitor a time at which the sidelink communications are inactive (i.e., no data traffic is present at the PC5 interface). In some cases, the status timer may be used to monitor a time during which the first UE 115-*e* does not successfully receive a transmission from the second UE 115-*f***.

At 420, the first UE **115-*e* may detect that a communications gap exceeds a threshold time or another condition to trigger the measurement procedure with the second UE 115-*f*. In some cases, the communications gap may correspond to an inactivity threshold, and when the inactivity threshold time is met, the measurement procedure is initiated in order to maintain link quality of the sidelink connection. In some cases, the communications gap may correspond to a time threshold for receiving communications from the second UE 115-*f*, and when the time threshold is met the measurement procedure is initiated in order to maintain link quality of the sidelink connection. The inactivity threshold time and the time threshold for receiving communications from the second UE 115-*f* may be used individually or in combination, and may correspond to a same time threshold value or different time threshold values. In some cases, additionally or alternatively, one or more other conditions may trigger the measurement procedure, such as a movement of acceleration of the first UE 115-*e*** exceeding an associated threshold value, for example.

At 425, the first UE **115-*e*** may format a data packet at the AS layer to initiate the measurement procedure. In some cases, the data packet may be a dummy packet that contains dummy data or predetermined data that is to be transmitted in order to maintain link quality of the sidelink connection. In some cases, the sidelink connection may be established using beamforming in mmW frequencies, and the data packet may be an SSB that is associated with a beam sweeping procedure.

At 430, the first UE **115-*e* may provide the data packet to the physical layer for reference signal insertion, which may provide the data packet with one or more data symbols and one or more reference signals (e.g., CSI-RS) in one or more reference signal symbols. As indicated above, in cases where beamforming is used, the data packet may be one or more SSBs for transmission via one or more beams in a beam sweeping procedure. At 435, the first UE 115-*e* may transmit the data packet to the second UE 115-*f***.

At 440, the second UE **115-*f*** may identify that the data packet indicates that the measurement procedure is to be performed. In some cases, the indication of the measurement procedure is an implicit indication that is based on the data packet being a dummy packet or containing no data and only reference signals. In other cases, the data packet may include an explicit indication, such as a predetermined measurement indication field, for example.

At 445, the second UE **115-*f* may initiate the measurement procedure. In some cases, the measurement procedure may be a reference signal measurement procedure (e.g., a CSI-RS measurement). In some cases, the second UE 115-*f* may prepare a measurement report (e.g., a CSI measurement report) that is provided to higher layers at the second UE 115-*f* for setting one or more transmission/reception parameters. In some cases, at 450, the second UE 115-*f* may optionally transmit the measurement report to the first UE 115-*e*, which the first UE 115-*e*** may use for setting one or more transmission/reception parameters.

Figure 5:
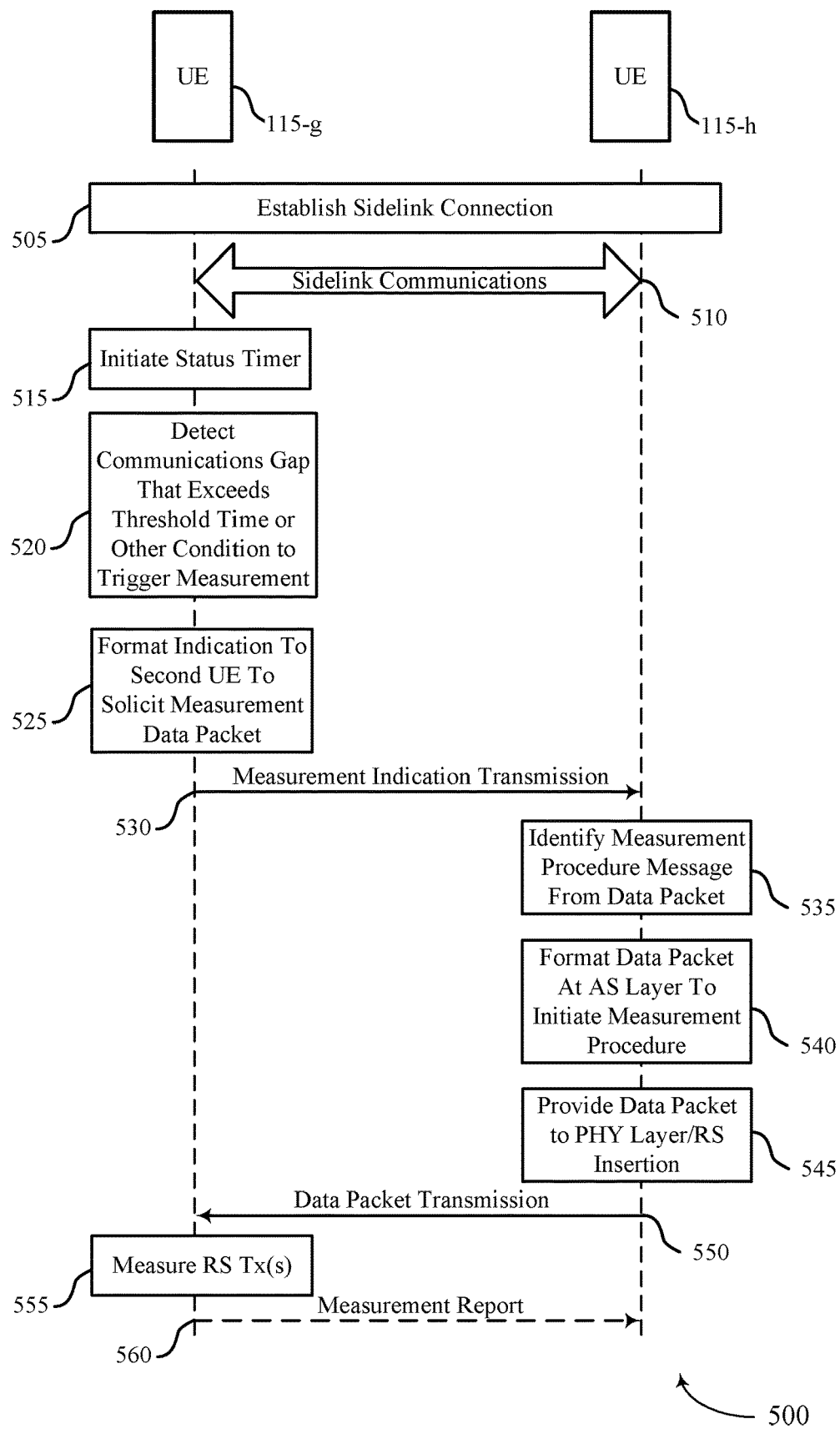
FIG. 5 illustrates an example of a process flow that supports radio link maintenance for sidelink wireless communications in accordance with aspects of the present disclosure.

FIG. 5 illustrates an example of a process flow 500 that supports radio link maintenance for sidelink wireless communications in accordance with aspects of the present disclosure. In some examples, process flow 500 may implement aspects of wireless communications system 100. In some examples, process flow 500 may implement aspects of wireless communications system 100, 200, or 300. The process flow 500 may include a UE **115-*g* and a UE 115-*h* which may be examples of the corresponding devices described with reference to FIGS. 1 through 3. The UE 115-*g* may be referred to as an initiating UE or first UE that initiates a beam maintenance procedure such as a measurement procedure, and UE 115-*h* may be referred to as a receiving UE or second UE at which the measurement procedure is initiated by the first UE 115-*g***. The layer signaling procedure may be an RRC layer signaling procedure, a V2X layer signaling procedure, and/or the like.

In the following description of the process flow 500, the operations between the UE **115-*g* and the UE 115-*h* may be transmitted in a different order than the exemplary order shown, or the operations performed by the first UE 115-*g* and the second UE 115-*h* may be performed in different orders or at different times. Certain operations may also be omitted from the process flow 500, and/or other operations may be added to the process flow 500**.

At 505, the first UE **115-*g* and the second UE 115-*h* may establish a sidelink connection. The sidelink connection may be established, for example, via a PC5 interface between the first UE 115-*g* and the second UE 115-*h*. For example, the first UE 115-*h*** may transmit a RRC message to the second UE 115-*h*, such as a connection request message (e.g. an RRC_SL_SETUP_REQ message) that may include a UE capability, a sidelink bearer configuration, QoS-related parameters, a Tx profile parameter, one or more measurement procedure parameters (e.g., periodicity, identity of initiating UE, beam sweeping parameters for FR2 connections, etc.), or a combination thereof. The second UE 115-*h* may transmit a response RRC message to the first UE 115-*g* based on, for example, an evaluation of the connection request message received, that accepts or rejects the request message (e.g., a DIRECT_COMM_ACCEPT message or DIRECT_COMM_REJECT message).

At 510, the first UE 115-*g* and the second UE 115-*h* may exchange sidelink communications. For example, the PC5 interface may provide data traffic that is transmitted/received at UEs 115 using the AS layer via physical channels (e.g., via FR1 or FR2 transmissions).

At 515, the first UE 115-*g* may initiate a status timer. In some cases, the status timer may be initiated after a sidelink communications transmission to or reception from the second UE 115-*h*. In some cases, the status timer may be used to monitor a time at which the sidelink communications are inactive (i.e., no data traffic is present at the PC5 interface). In some cases, the status timer may be used to monitor a time during which the first UE 115-*g* does not successfully receive a transmission from the second UE 115-*h*.

At 520, the first UE 115-*g* may detect that a communications gap exceeds a threshold time or another condition to trigger the measurement procedure with the second UE 115-*h*. In some cases, the communications gap may correspond to an inactivity threshold, and when the inactivity threshold time is met, the measurement procedure is initiated in order to maintain link quality of the sidelink connection. In some cases, the communications gap may correspond to a time threshold for receiving communications from the second UE 115-*h*, and when the time threshold is met the measurement procedure is initiated in order to maintain link quality of the sidelink connection. The inactivity threshold time and the time threshold for receiving communications from the second UE 115-*h* may be used individually or in combination, and may correspond to a same time threshold value or different time threshold values. In some cases, additionally or alternatively, one or more other conditions may trigger the measurement procedure, such as a movement of acceleration of the first UE 115-*g* exceeding an associated threshold value, for example.

At 525, the first UE 115-*g* may format an indication to the second UE 115-*h* to solicit a measurement data packet from the second UE 115-*h*. In some cases, the indication to the second UE 115-*h* may be an explicit indication to transmit a measurement data packet, or an implicit indication to transit the measurement data packet. At 530, the first UE 115-*g* may transmit the measurement indication transmission to the second UE 115-*h*.

At 535, the second UE 115-*h* may identify the measurement procedure message from the data packet received from the first UE 115-*g*. As indicated above, the measurement procedure message may include an explicit indication to transmit the measurement data packet (e.g., an explicit indication in a MAC-CE) or an implicit indication (e.g., based on receiving a dummy data packet or data packet with only reference signals).

At 540, the second UE 115-*h* may format a data packet at the AS layer to initiate the measurement procedure. In some cases, the data packet may be a dummy packet that contains dummy data or predetermined data that is to be transmitted in order to maintain link quality of the sidelink connection.

In some cases, the sidelink connection may be established using beamforming in mmW frequencies, and the data packet may be an SSB that is associated with a beam sweeping procedure.

At 545, the second UE 115-*h* may provide the data packet to the physical layer for reference signal insertion, which may provide the data packet with one or more data symbols and one or more reference signals (e.g., CSI-RS) in one or more reference signal symbols. As indicated above, in cases where beamforming is used, the data packet may be one or more SSBs for transmission via one or more beams in a beam sweeping procedure. At 550, the second UE 115-*h* may transmit the data packet to the first UE 115-*g*.

At 555, the first UE 115-*g* may receive the data packet from the second UE 115-*h* initiate the measurement procedure. In some cases, the measurement procedure may be a reference signal measurement procedure (e.g., a CSI-RS measurement). In some cases, the first UE 115-*g* may prepare a measurement report (e.g., a CSI measurement report) that is provided to higher layers at the first UE 115-*g* for setting one or more transmission/reception parameters. In some cases, at 560, the first UE 115-*h* may optionally transmit the measurement report to the second UE 115-*h*, which the second UE 115-*h* may use for setting one or more transmission/reception parameters.

Figure 6:
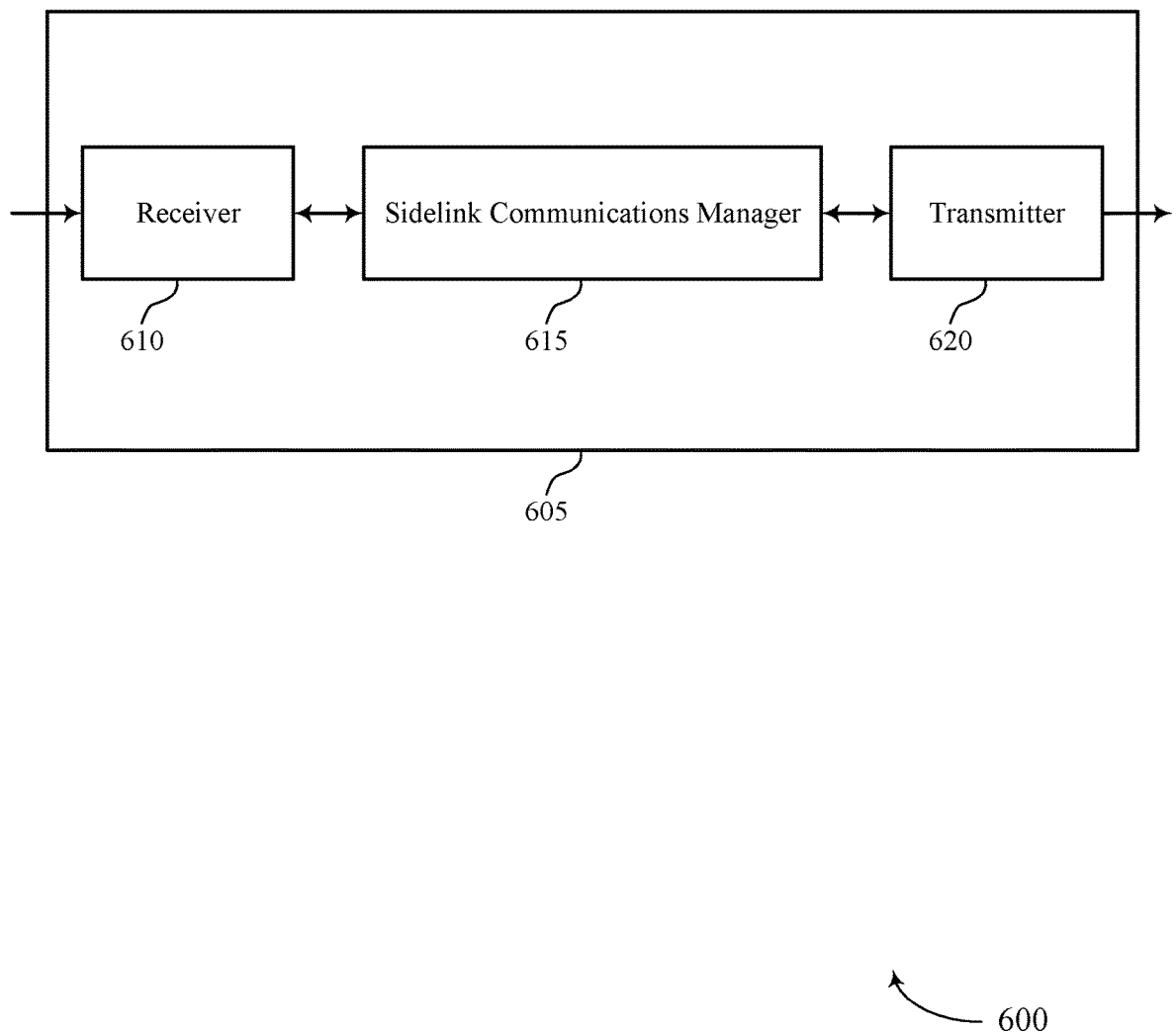
FIGS. 6 and 7 show block diagrams of devices that support radio link maintenance for sidelink wireless communications in accordance with aspects of the present disclosure.

FIG. 6 shows a block diagram 600 of a device 605 that supports radio link maintenance for sidelink wireless communications in accordance with aspects of the present disclosure. The device 605 may be an example of aspects of a UE 115 as described herein. The device 605 may include a receiver 610, a sidelink communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to radio link maintenance for sidelink wireless communications, etc.). Information may be passed on to other components of the device 605. The receiver 610 may be an example of aspects of the transceiver 920 described with reference to FIG. 9. The receiver 610 may utilize a single antenna or a set of antennas.

The sidelink communications manager 615 may establish, at the first UE, a sidelink connection with a second UE, detect, based on a status timer at an access stratum layer of the first UE, that a gap in communications with the second UE via the sidelink connection exceeds a threshold time, and initiate, at the access stratum layer, a link maintenance procedure to maintain the sidelink connection with the second UE.

The sidelink communications manager 615 may also establish, at the second UE, a sidelink connection with a first UE, receive, from the first UE, a link maintenance procedure message via the sidelink connection to initiate a link maintenance procedure, where the link maintenance procedure message is received in an absence of sidelink data communications via the sidelink connection, and initiate the link maintenance procedure based on the link maintenance procedure message. The sidelink communications manager 615 may be an example of aspects of the sidelink communications manager 910 described herein.

Based on the actions performed by the sidelink communications manager 615 as described herein, a UE 115 may transmit a data message to initiate a link maintenance procedure with another UE in accordance with various techniques provided herein. Such techniques may provide for enhanced radio link management of sidelink connections that may allow for more reliable reception and decoding of sidelink communications, thereby enhancing system efficiency and reliability. Further, latency may also be reduced with the base station receiving and decoding payloads more reliably.

The sidelink communications manager 615, or its sub-components, may be implemented in hardware, code (e.g., software or firmware) executed by a processor, or any combination thereof. If implemented in code executed by a processor, the functions of the sidelink communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The sidelink communications manager 615, or its sub-components, may be physically located at various positions, including being distributed such that portions of functions are implemented at different physical locations by one or more physical components. In some examples, the sidelink communications manager 615, or its sub-components, may be a separate and distinct component in accordance with various aspects of the present disclosure. In some examples, the sidelink communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
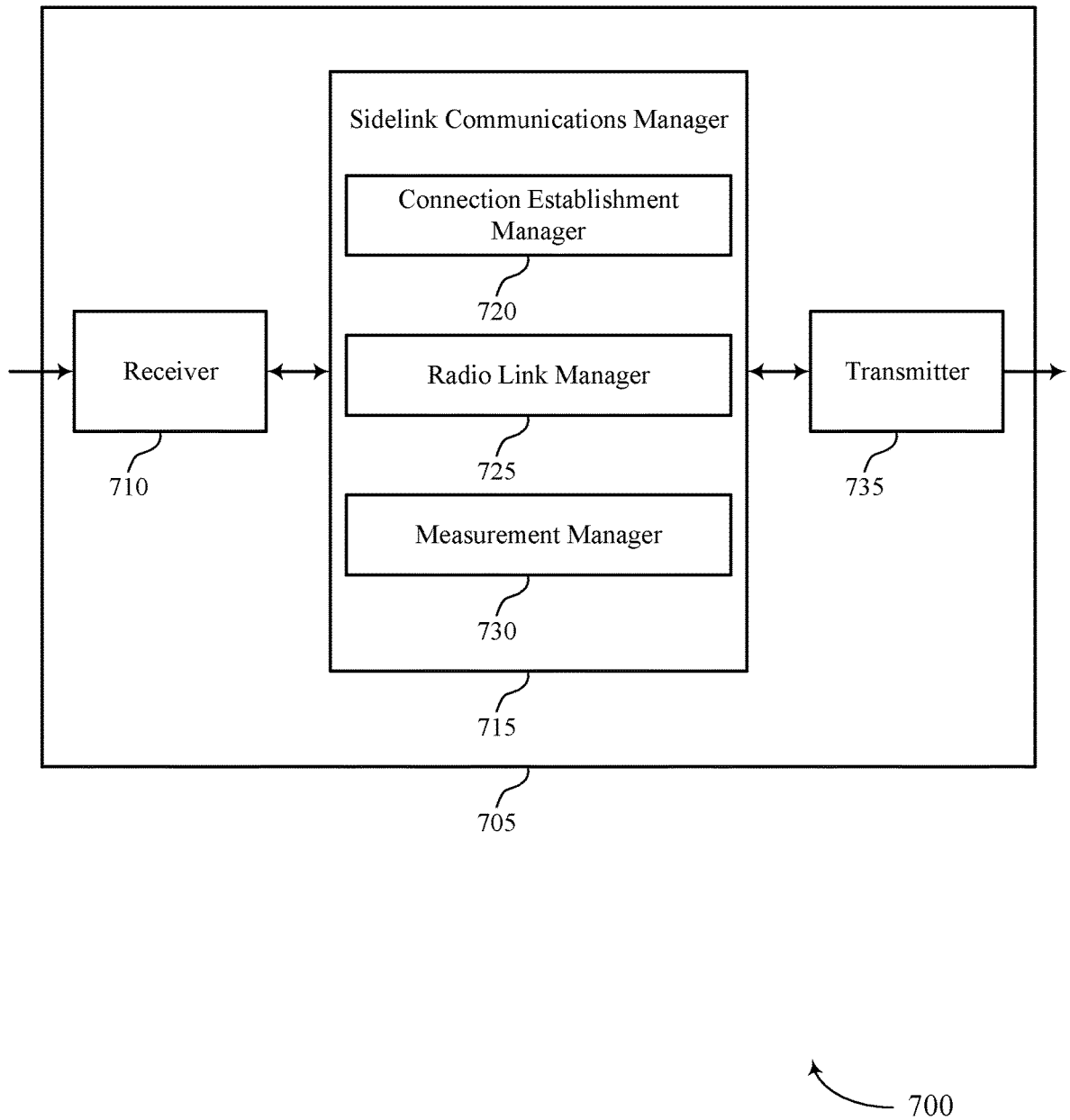

FIG. 7 shows a block diagram 700 of a device 705 that supports radio link maintenance for sidelink wireless communications in accordance with aspects of the present disclosure. The device 705 may be an example of aspects of a device 605, or a UE 115 as described herein. The device 705 may include a receiver 710, a sidelink communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to radio link maintenance for sidelink wireless communications, etc.). Information may be passed on to other components of the device 705. The receiver 710 may be an example of aspects of the transceiver 920 described with reference to FIG. 9. The receiver 710 may utilize a single antenna or a set of antennas.

The sidelink communications manager 715 may be an example of aspects of the sidelink communications manager 615 as described herein. The sidelink communications manager 715 may include a connection establishment manager 720, a radio link manager 725, and a measurement manager 730. The sidelink communications manager 715 may be an example of aspects of the sidelink communications manager 910 described herein.

The connection establishment manager 720 may establish, at the first UE, a sidelink connection with a second UE.

The radio link manager 725 may detect, based on a status timer at an access stratum layer of the first UE, that a gap in communications with the second UE via the sidelink connection exceeds a threshold time.

The measurement manager 730 may initiate, at the access stratum layer, a link maintenance procedure to maintain the sidelink connection with the second UE.

In some cases, the connection establishment manager 720 may establish, at the second UE, a sidelink connection with a first UE. The radio link manager 725 may receive, from the first UE, a link maintenance procedure message via the sidelink connection to initiate a link maintenance procedure, where the link maintenance procedure message is received in an absence of sidelink data communications via the sidelink connection. The measurement manager 730 may initiate the link maintenance procedure based on the link maintenance procedure message.

Based on receiving the system information, a processor of a UE 115 (e.g., controlling the receiver 710, the transmitter 735, or a transceiver 920 as described with reference to FIG. 9) may transmit a data message to initiate a link maintenance procedure with another UE in accordance with various techniques provided herein. Such techniques may provide for enhanced radio link management of sidelink connections that may allow for more reliable reception and decoding of sidelink communications, thereby enhancing system efficiency and reliability. Further, latency may also be reduced with the base station receiving and decoding payloads more reliably.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
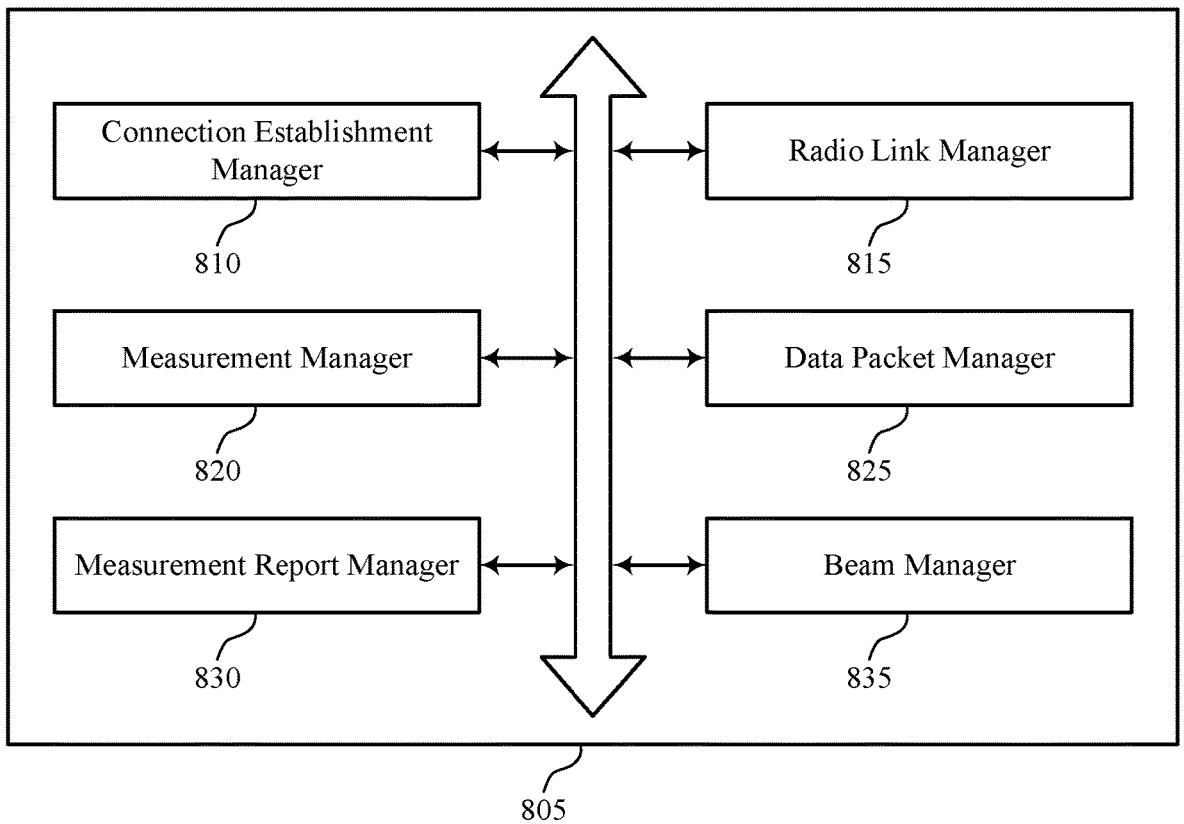
FIG. 8 shows a block diagram of a sidelink communications manager that supports radio link maintenance for sidelink wireless communications in accordance with aspects of the present disclosure.

FIG. 8 shows a block diagram 800 of a sidelink communications manager 805 that supports radio link maintenance for sidelink wireless communications in accordance with aspects of the present disclosure. The sidelink communications manager 805 may be an example of aspects of a sidelink communications manager 615, a sidelink communications manager 715, or a sidelink communications manager 910 described herein. The sidelink communications manager 805 may include a connection establishment manager 810, a radio link manager 815, a measurement manager 820, a data packet manager 825, a measurement report manager 830, and a beam manager 835. Each of these modules may communicate, directly or indirectly, with one another (e.g., via one or more buses).

In some examples, the sidelink communications manager 905 may be in a first UE, and the connection establishment manager 810 may establish, at the first UE, a sidelink connection with a second UE. In some examples, the sidelink communications manager 905 may be in a second UE, and the connection establishment manager 810 may establish, at the second UE, a sidelink connection with a first UE.

In some examples, the connection establishment manager 810 may receive one or more of a radio resource control message, a medium access control (MAC) control element, or any combinations thereof, that configures the link maintenance procedure. In some examples, the connection establishment manager 810 may transmit an indication to the second UE that the first UE is configured to trigger the link maintenance procedure for both the first UE and the second UE. In some examples, the connection establishment manager 810 may receive an indication from the first UE that the first UE is configured to trigger the link maintenance procedure for both the first UE and the second UE.

In some cases, each of the first UE and the second UE independently trigger the link maintenance procedure based on data traffic communications via the sidelink connection. In some cases, the sidelink connection is a unicast sidelink connection.

The radio link manager 815 may detect, based on a status timer at an access stratum layer of the first UE, that a gap in communications with the second UE via the sidelink connection exceeds a threshold time.

In some examples, the radio link manager 815 may receive, from the first UE, a measurement procedure message via the sidelink connection to initiate a measurement procedure, where the measurement procedure message is received in an absence of sidelink data communications via the sidelink connection.

In some examples, the radio link manager 815 may determine that data traffic of the sidelink connection has been inactive for at least the threshold time.

In some examples, the radio link manager 815 may determine that a signal from the second UE via the sidelink connection has not been successfully received for at least the threshold time.

In some examples, the radio link manager 815 may transmit a signal to solicit the second UE to transmit a data packet at the access stratum layer for measurement at the first UE.

In some examples, the radio link manager 815 may transmit an indication to a lower layer to transmit a reference signal transmission to the second UE. In some examples, the radio link manager 815 may identify, at the access stratum layer, new data traffic for the sidelink connection with the second UE, and may discontinue the measurement procedure.

In some examples, the radio link manager 815 may transmit, to the first UE, a measurement report indicating the one or more channel characteristics. In some examples, the radio link manager 815 may format, responsive to the initiating, a data packet at the access stratum layer for transmission to the first UE.

In some examples, the radio link manager 815 may provide the data packet to a lower layer for insertion of one or more reference signals. In some examples, the radio link manager 815 may transmit the data packet and one or more reference signals to the first UE over the sidelink connection. In some cases, the reference signal transmission to the second UE is a channel state information reference signal (CSI-RS) transmission using only reference signal symbols.

The measurement manager 820 may initiate, at the access stratum layer, a measurement procedure to measure one or more channel characteristics of the sidelink connection with the second UE.

In some examples, the measurement manager 820 may initiate the measurement procedure based on the measurement procedure message.

In some examples, the measurement manager 820 may repeat the measurement procedure to measure one or more channel characteristics of the sidelink connection with the second UE according to a predetermined periodicity.

In some examples, the measurement manager 820 may measure one or more channel characteristics based on one or more reference signals of the measurement procedure message.

In some examples, the measurement manager 820 may monitor for measurement procedure messages from the first UE according to a predetermined periodicity.

The data packet manager 825 may format, responsive to the initiating, a data packet at the access stratum layer for transmission to the second UE. In some examples, the data packet manager 825 may provide the data packet to a lower layer for insertion of one or more reference signals. In some examples, the data packet manager 825 may transmit the data packet and one or more reference signals to the second UE over the sidelink connection. In some examples, the data packet manager 825 may format an access stratum layer dummy packet independently of input from one or more higher layers. In some examples, the data packet manager 825 may transmit, responsive to initiating the measurement procedure, a sidelink reference signal to the second UE for sidelink measurements according to the measurement procedure.

In some examples, the data packet manager 825 may receive, at an access stratum layer of the second UE, a dummy packet from the first UE that does not contain data that is to be provided to one or more higher layers. In some examples, the data packet manager 825 may determine, based on the dummy packet, to initiate the measurement procedure to measure one or more channel characteristics of the sidelink connection. In some cases, the measurement procedure message from the first UE includes one or more reference signals, and where the one or more reference signals include a sidelink reference signal for sidelink measurements according to a sidelink measurement procedure.

The measurement report manager 830 may receive, from the second UE, a measurement report based on the one or more reference signals.

The beam manager 835 may trigger a beam sweep procedure to align one or more transmission beams between the first UE and the second UE and form a beam pair link. In some examples, the beam manager 835 may transmit two or more reference signals using two or more different transmission beams to the second UE. In some examples, the beam manager 835 may receive one or more response transmissions from the second UE via one or more receive beams. In some examples, the beam manager 835 may determine the beam pair link based on the one or more response transmissions.

In some examples, the beam manager 835 may initiate, responsive to receiving the measurement procedure message, a beam sweep procedure to align one or more transmission beams between the first UE and the second UE and form a beam pair link. In some examples, the beam manager 835 may receive two or more reference signals using two or more different transmission beams from the first UE. In some examples, the beam manager 835 may measure one or more channel characteristics of each of the two or more different transmission beams. In some examples, the beam manager 835 may transmit a measurement report to the first UE that indicates a preferred transmission beam for the beam pair link.

Figure 9:
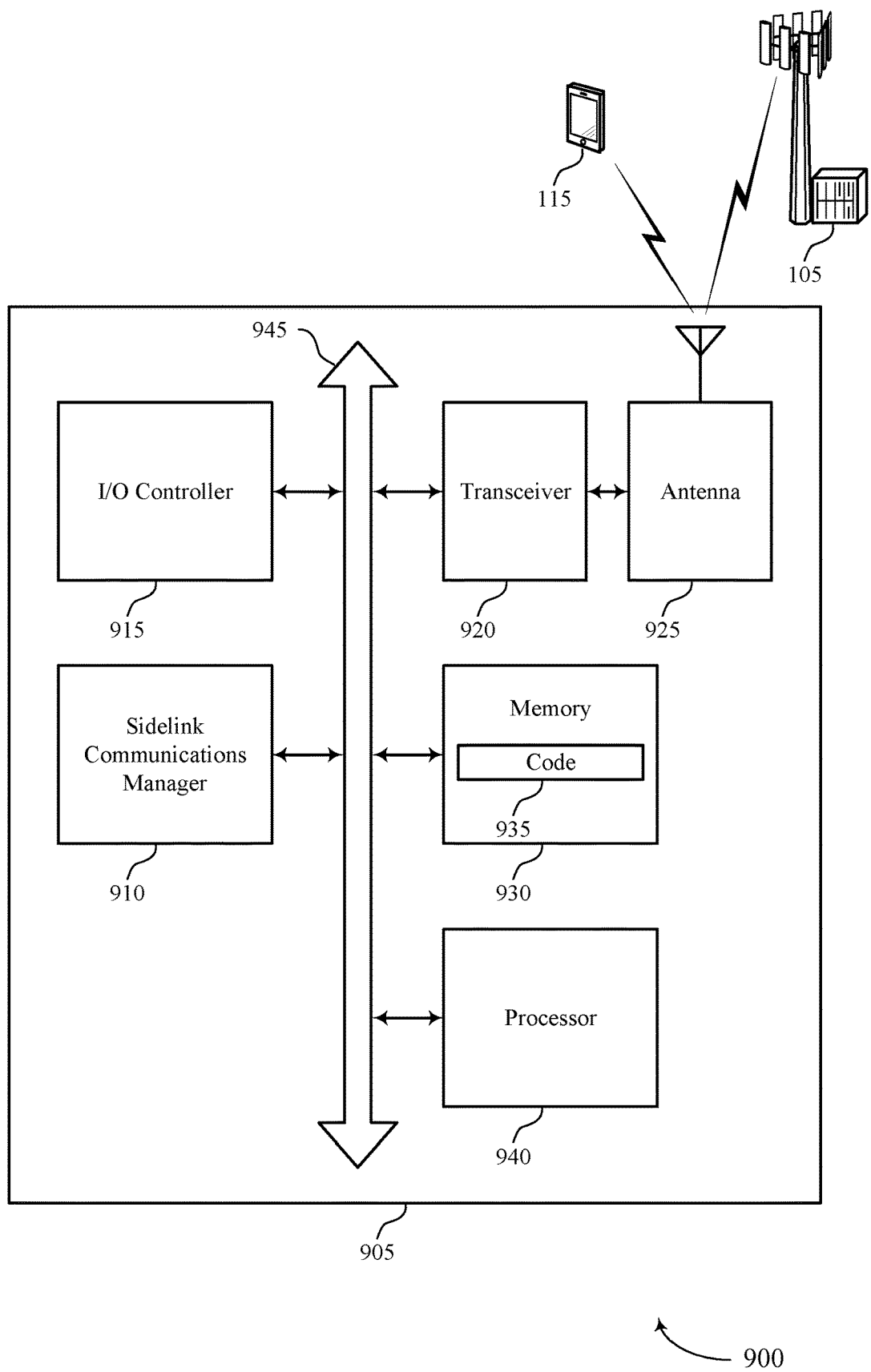
FIG. 9 shows a diagram of a system including a device that supports radio link maintenance for sidelink wireless communications in accordance with aspects of the present disclosure.

FIG. 9 shows a diagram of a system 900 including a device 905 that supports radio link maintenance for sidelink wireless communications in accordance with aspects of the present disclosure. The device 905 may be an example of or include the components of device 605, device 705, or a UE 115 as described herein. The device 905 may include components for bi-directional voice and data communications including components for transmitting and receiving communications, including a sidelink communications manager 910, an I/O controller 915, a transceiver 920, an antenna

925, memory 930, and a processor 940. These components may be in electronic communication via one or more buses (e.g., bus 945).

The sidelink communications manager 910 may establish, at the first UE, a sidelink connection with a second UE, detect, based on a status timer at an access stratum layer of the first UE, that a gap in communications with the second UE via the sidelink connection exceeds a threshold time, and initiate, at the access stratum layer, a link maintenance procedure to maintain the sidelink connection with the second UE.

The sidelink communications manager 910 may also establish, at the second UE, a sidelink connection with a first UE, receive, from the first UE, a link maintenance procedure message via the sidelink connection to initiate a link maintenance procedure, where the link maintenance procedure message is received in an absence of sidelink data communications via the sidelink connection, and initiate the link maintenance procedure based on the link maintenance procedure message.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting radio link maintenance for sidelink wireless communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
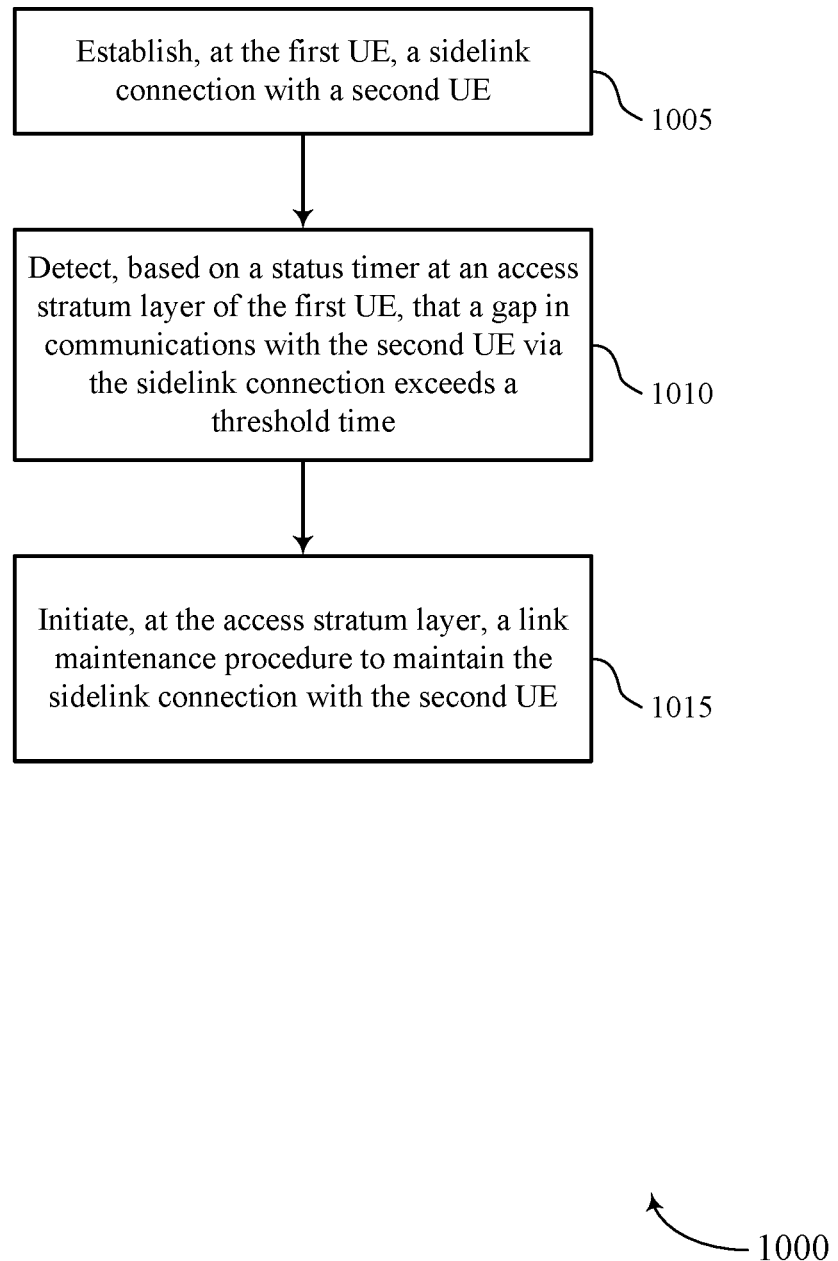
FIGS. 10 through 16 show flowcharts illustrating methods that support radio link maintenance for sidelink wireless communications in accordance with aspects of the present disclosure.

FIG. 10 shows a flowchart illustrating a method 1000 that supports radio link maintenance for sidelink wireless communications in accordance with aspects of the present disclosure. The operations of method 1000 may be implemented by a first UE 115 or its components as described herein. For example, the operations of method 1000 may be performed by a sidelink communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1005, the first UE may establish a sidelink connection with a second UE. The operations of 1005 may be performed according to the methods described herein. In some examples, aspects of the operations of 1005 may be performed by a connection establishment manager as described with reference to FIGS. 6 through 9.

At 1010, the first UE may detect, based on a status timer at an access stratum layer of the first UE, that a gap in communications with the second UE via the sidelink connection exceeds a threshold time. The operations of 1010 may be performed according to the methods described herein. In some examples, aspects of the operations of 1010 may be performed by a radio link manager as described with reference to FIGS. 6 through 9.

At 1015, the first UE may initiate, at the access stratum layer, a link maintenance procedure to maintain the sidelink connection with the second UE. The operations of 1015 may be performed according to the methods described herein. In some examples, aspects of the operations of 1015 may be performed by a measurement manager as described with reference to FIGS. 6 through 9.

Figure 11:
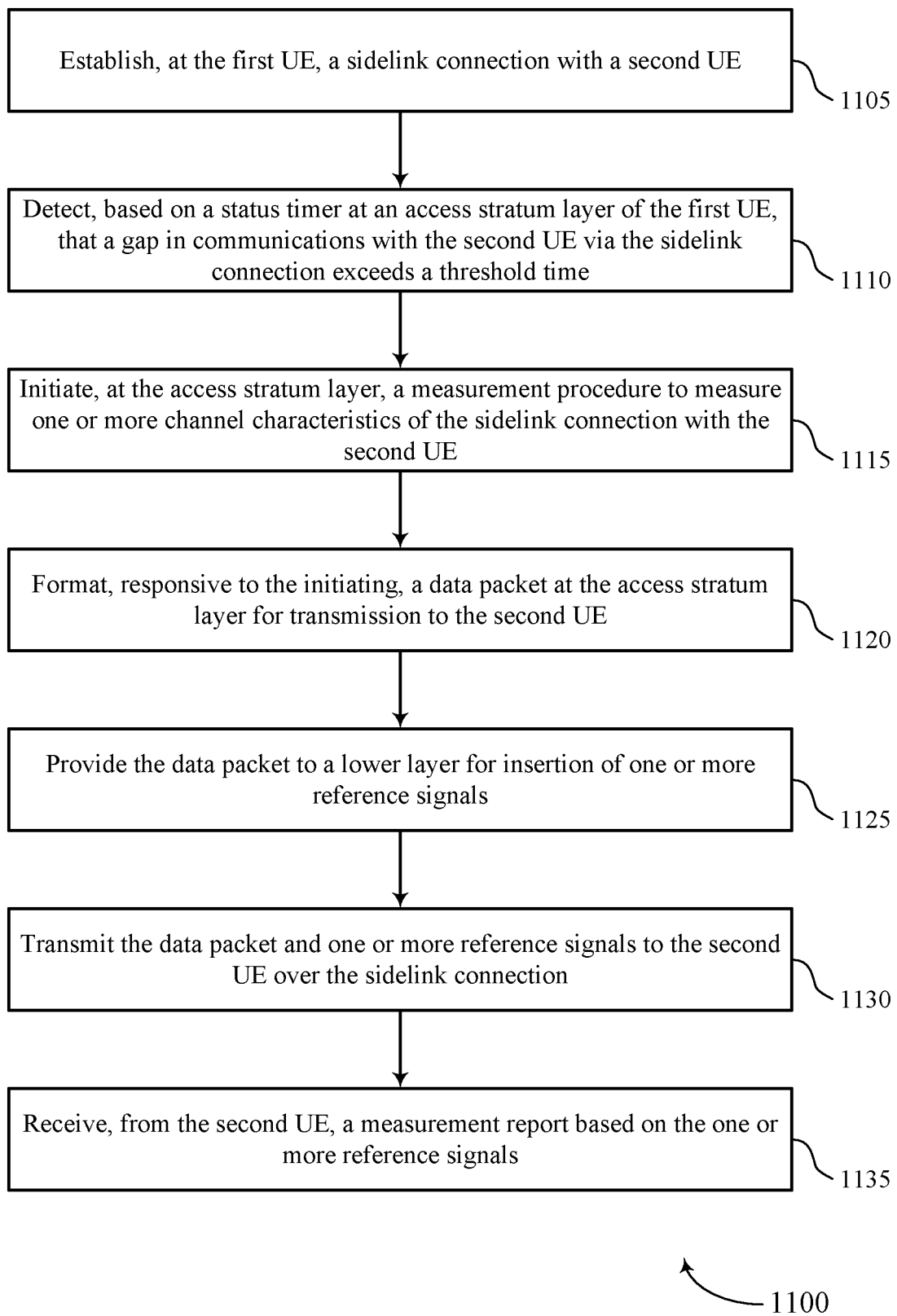

FIG. 11 shows a flowchart illustrating a method 1100 that supports radio link maintenance for sidelink wireless communications in accordance with aspects of the present disclosure. The operations of method 1100 may be implemented by a first UE 115 or its components as described herein. For example, the operations of method 1100 may be performed by a sidelink communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1105, the first UE may establish a sidelink connection with a second UE. The operations of 1105 may be performed according to the methods described herein. In some examples, aspects of the operations of 1105 may be performed by a connection establishment manager as described with reference to FIGS. 6 through 9.

At 1110, the first UE may detect, based on a status timer at an access stratum layer of the first UE, that a gap in communications with the second UE via the sidelink connection exceeds a threshold time. The operations of 1110 may be performed according to the methods described herein. In some examples, aspects of the operations of 1110 may be performed by a radio link manager as described with reference to FIGS. 6 through 9.

At 1115, the first UE may initiate, at the access stratum layer, a measurement procedure to measure one or more channel characteristics of the sidelink connection with the second UE. The operations of 1115 may be performed according to the methods described herein. In some examples, aspects of the operations of 1115 may be performed by a measurement manager as described with reference to FIGS. 6 through 9.

At 1120, the first UE may format, responsive to the initiating, a data packet at the access stratum layer for transmission to the second UE. The operations of 1120 may be performed according to the methods described herein. In some examples, aspects of the operations of 1120 may be performed by a data packet manager as described with reference to FIGS. 6 through 9.

At 1125, the first UE may provide the data packet to a lower layer for insertion of one or more reference signals. The operations of 1125 may be performed according to the methods described herein. In some examples, aspects of the operations of 1125 may be performed by a data packet manager as described with reference to FIGS. 6 through 9.

At 1130, the first UE may transmit the data packet and one or more reference signals to the second UE over the sidelink connection. The operations of 1130 may be performed according to the methods described herein. In some examples, aspects of the operations of 1130 may be performed by a data packet manager as described with reference to FIGS. 6 through 9.

At 1135, the first UE may receive, from the second UE, a measurement report based on the one or more reference signals. The operations of 1135 may be performed according to the methods described herein. In some examples, aspects of the operations of 1135 may be performed by a measurement report manager as described with reference to FIGS. 6 through 9.

Figure 12:
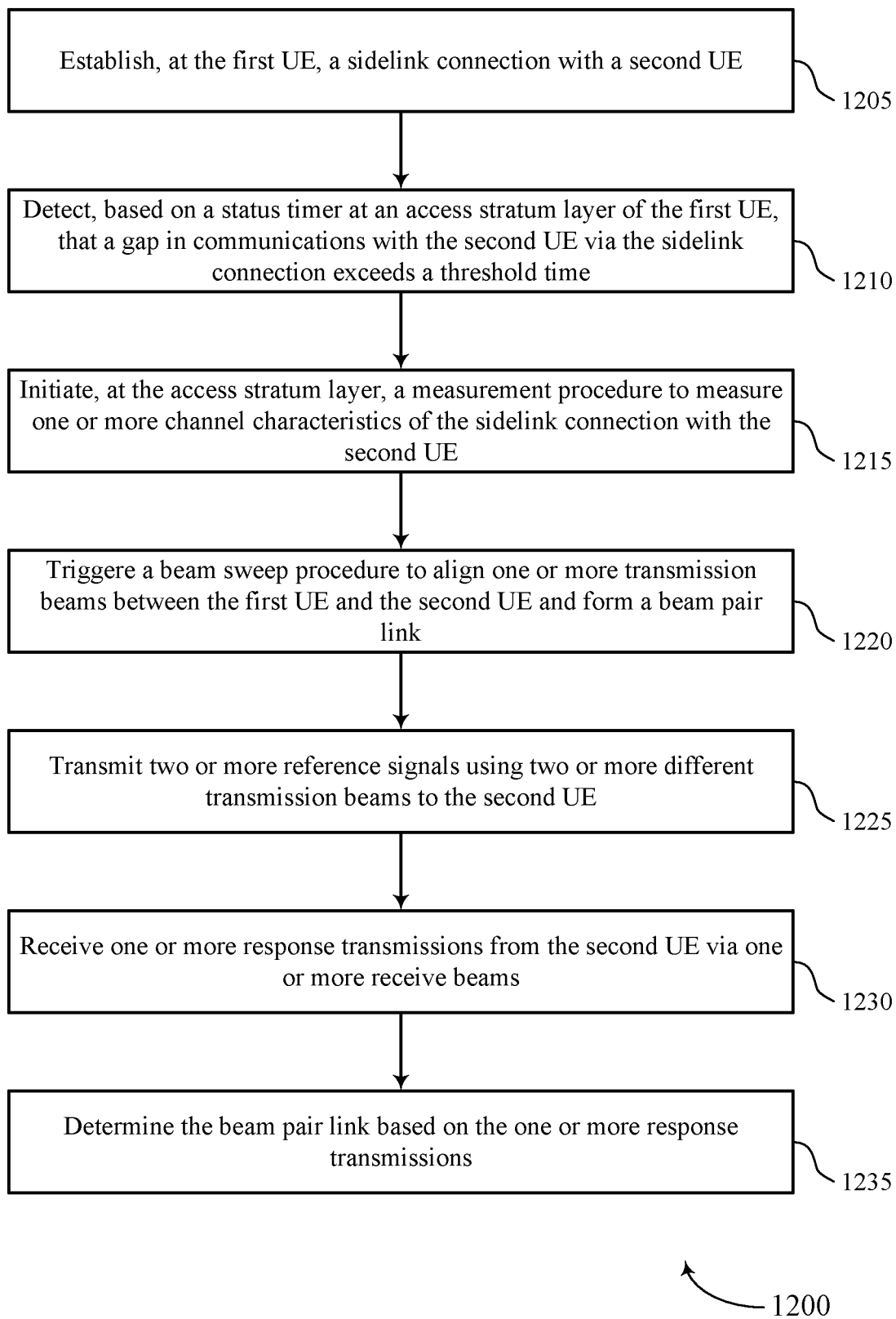

FIG. 12 shows a flowchart illustrating a method 1200 that supports radio link maintenance for sidelink wireless communications in accordance with aspects of the present disclosure. The operations of method 1200 may be implemented by a first UE 115 or its components as described herein. For example, the operations of method 1200 may be performed by a sidelink communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1205, the first UE may establish a sidelink connection with a second UE. The operations of 1205 may be performed according to the methods described herein. In some examples, aspects of the operations of 1205 may be performed by a connection establishment manager as described with reference to FIGS. 6 through 9.

At 1210, the first UE may detect, based on a status timer at an access stratum layer of the first UE, that a gap in communications with the second UE via the sidelink connection exceeds a threshold time. The operations of 1210 may be performed according to the methods described herein. In some examples, aspects of the operations of 1210 may be performed by a radio link manager as described with reference to FIGS. 6 through 9.

At 1215, the first UE may initiate, at the access stratum layer, a measurement procedure to measure one or more channel characteristics of the sidelink connection with the second UE. The operations of 1215 may be performed according to the methods described herein. In some examples, aspects of the operations of 1215 may be performed by a measurement manager as described with reference to FIGS. 6 through 9.

At 1220, the first UE may trigger a beam sweep procedure to align one or more transmission beams between the first UE and the second UE and form a beam pair link. The operations of 1220 may be performed according to the methods described herein. In some examples, aspects of the operations of 1220 may be performed by a beam manager as described with reference to FIGS. 6 through 9.

At 1225, the first UE may transmit two or more reference signals using two or more different transmission beams to the second UE. The operations of 1225 may be performed according to the methods described herein. In some examples, aspects of the operations of 1225 may be performed by a beam manager as described with reference to FIGS. 6 through 9.

At 1230, the first UE may receive one or more response transmissions from the second UE via one or more receive beams. The operations of 1230 may be performed according to the methods described herein. In some examples, aspects of the operations of 1230 may be performed by a beam manager as described with reference to FIGS. 6 through 9.

At 1235, the first UE may determine the beam pair link based on the one or more response transmissions. The operations of 1235 may be performed according to the methods described herein. In some examples, aspects of the operations of 1235 may be performed by a beam manager as described with reference to FIGS. 6 through 9.

Figure 13:
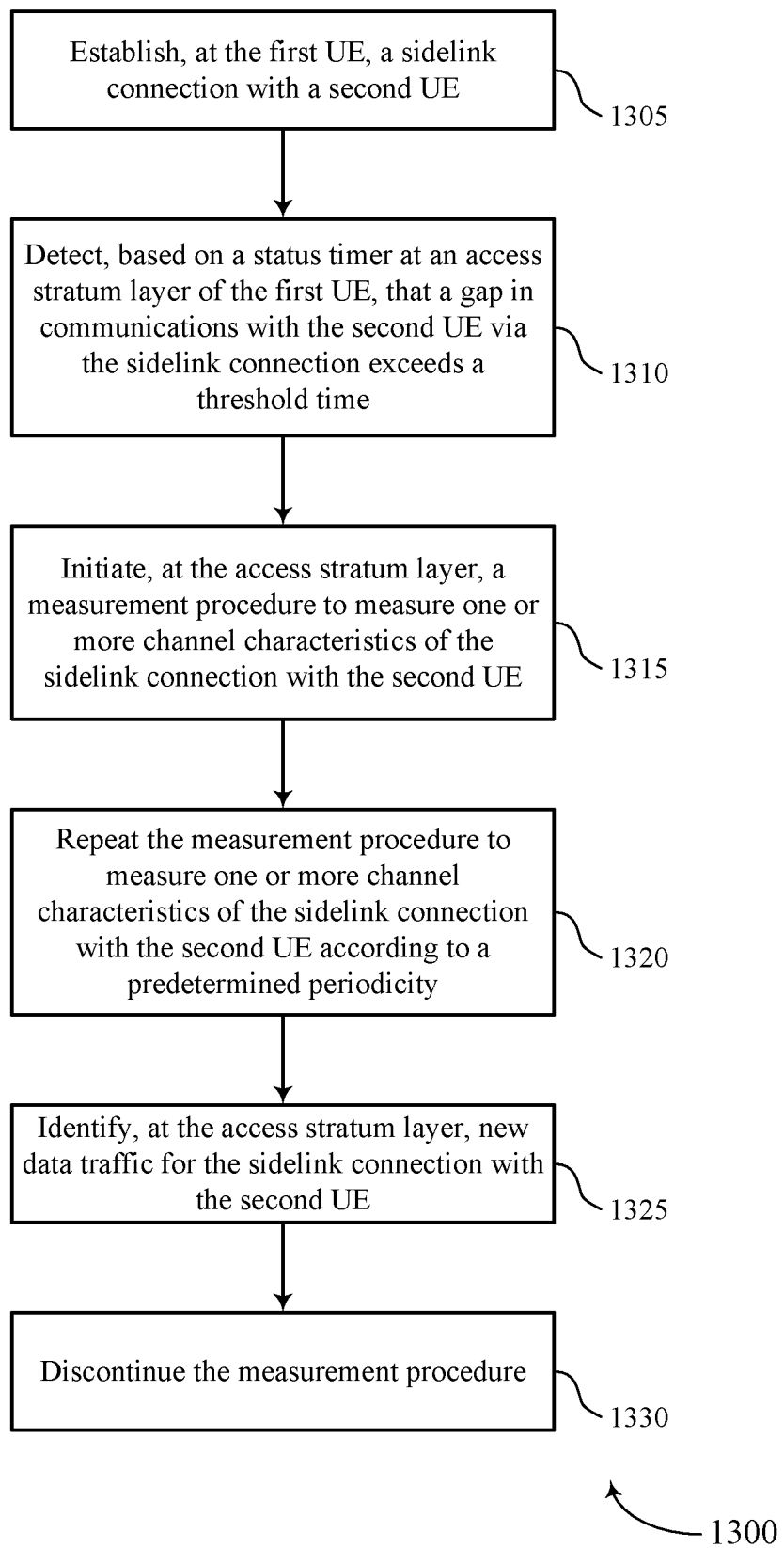

FIG. 13 shows a flowchart illustrating a method 1300 that supports radio link maintenance for sidelink wireless communications in accordance with aspects of the present disclosure. The operations of method 1300 may be implemented by a first UE 115 or its components as described herein. For example, the operations of method 1300 may be performed by a sidelink communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1305, the first UE may establish a sidelink connection with a second UE. The operations of 1305 may be performed according to the methods described herein. In some examples, aspects of the operations of 1305 may be performed by a connection establishment manager as described with reference to FIGS. 6 through 9.

At 1310, the first UE may detect, based on a status timer at an access stratum layer of the first UE, that a gap in communications with the second UE via the sidelink connection exceeds a threshold time. The operations of 1310 may be performed according to the methods described herein. In some examples, aspects of the operations of 1310 may be performed by a radio link manager as described with reference to FIGS. 6 through 9.

At 1315, the first UE may initiate, at the access stratum layer, a measurement procedure to measure one or more channel characteristics of the sidelink connection with the second UE. The operations of 1315 may be performed according to the methods described herein. In some examples, aspects of the operations of 1315 may be performed by a measurement manager as described with reference to FIGS. 6 through 9.

At 1320, the first UE may repeat the measurement procedure to measure one or more channel characteristics of the sidelink connection with the second UE according to a predetermined periodicity. The operations of 1320 may be performed according to the methods described herein. In some examples, aspects of the operations of 1320 may be performed by a measurement manager as described with reference to FIGS. 6 through 9.

At 1325, the first UE may identify, at the access stratum layer, new data traffic for the sidelink connection with the second UE. The operations of 1325 may be performed according to the methods described herein. In some examples, aspects of the operations of 1325 may be performed by a radio link manager as described with reference to FIGS. 6 through 9.

At 1330, the first UE may discontinue the measurement procedure. The operations of 1330 may be performed according to the methods described herein. In some examples, aspects of the operations of 1330 may be performed by a radio link manager as described with reference to FIGS. 6 through 9.

Figure 14:
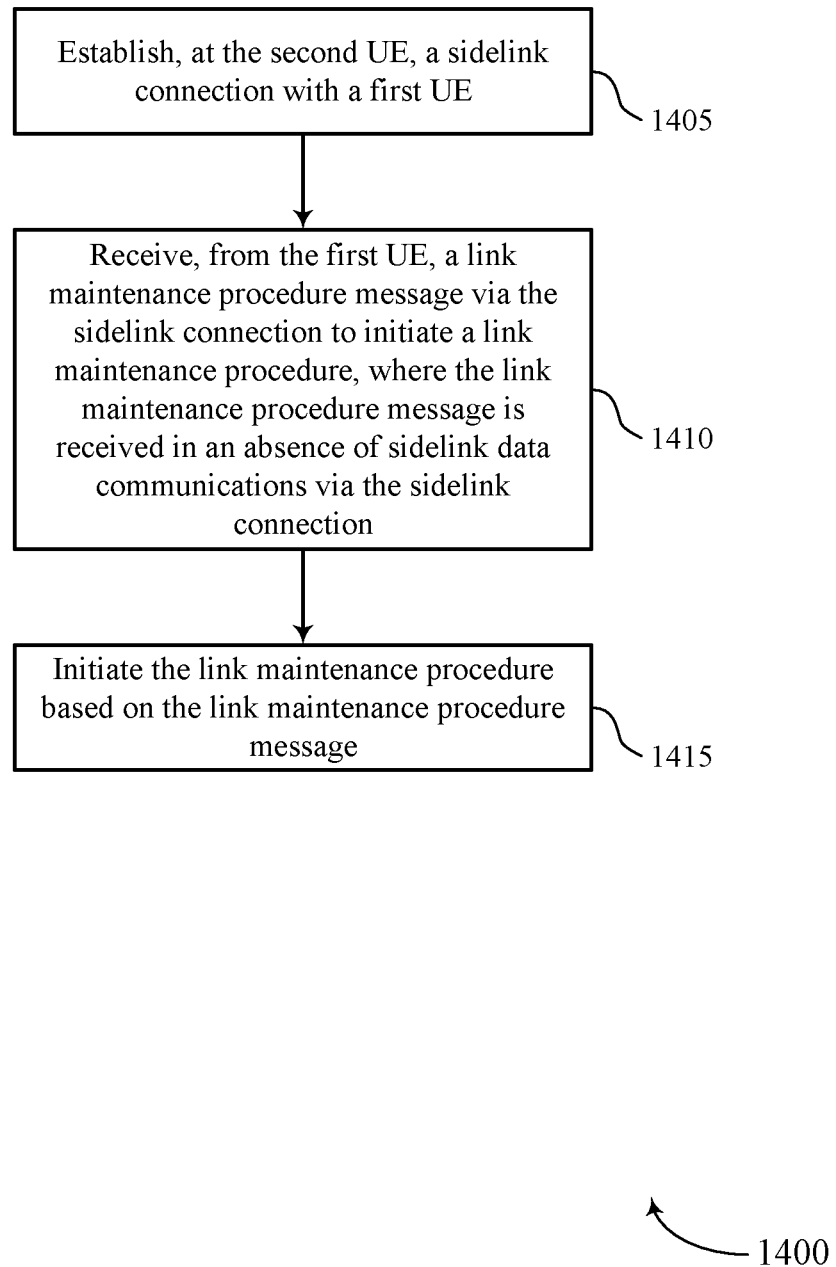

FIG. 14 shows a flowchart illustrating a method 1400 that supports radio link maintenance for sidelink wireless communications in accordance with aspects of the present disclosure. The operations of method 1400 may be implemented by a second UE 115 or its components as described herein. For example, the operations of method 1400 may be performed by a sidelink communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the second UE may establish a sidelink connection with a first UE. The operations of 1405 may be performed according to the methods described herein. In some examples, aspects of the operations of 1405 may be performed by a connection establishment manager as described with reference to FIGS. 6 through 9.

At 1410, the second UE may receive, from the first UE, a link maintenance procedure message via the sidelink connection to initiate a link maintenance procedure, where the link maintenance procedure message is received in an absence of sidelink data communications via the sidelink connection. The operations of 1410 may be performed according to the methods described herein. In some examples, aspects of the operations of 1410 may be performed by a radio link manager as described with reference to FIGS. 6 through 9.

At 1415, the second UE may initiate the link maintenance procedure based on the link maintenance procedure message. The operations of 1415 may be performed according to the methods described herein. In some examples, aspects of the operations of 1415 may be performed by a measurement manager as described with reference to FIGS. 6 through 9.

Figure 15:
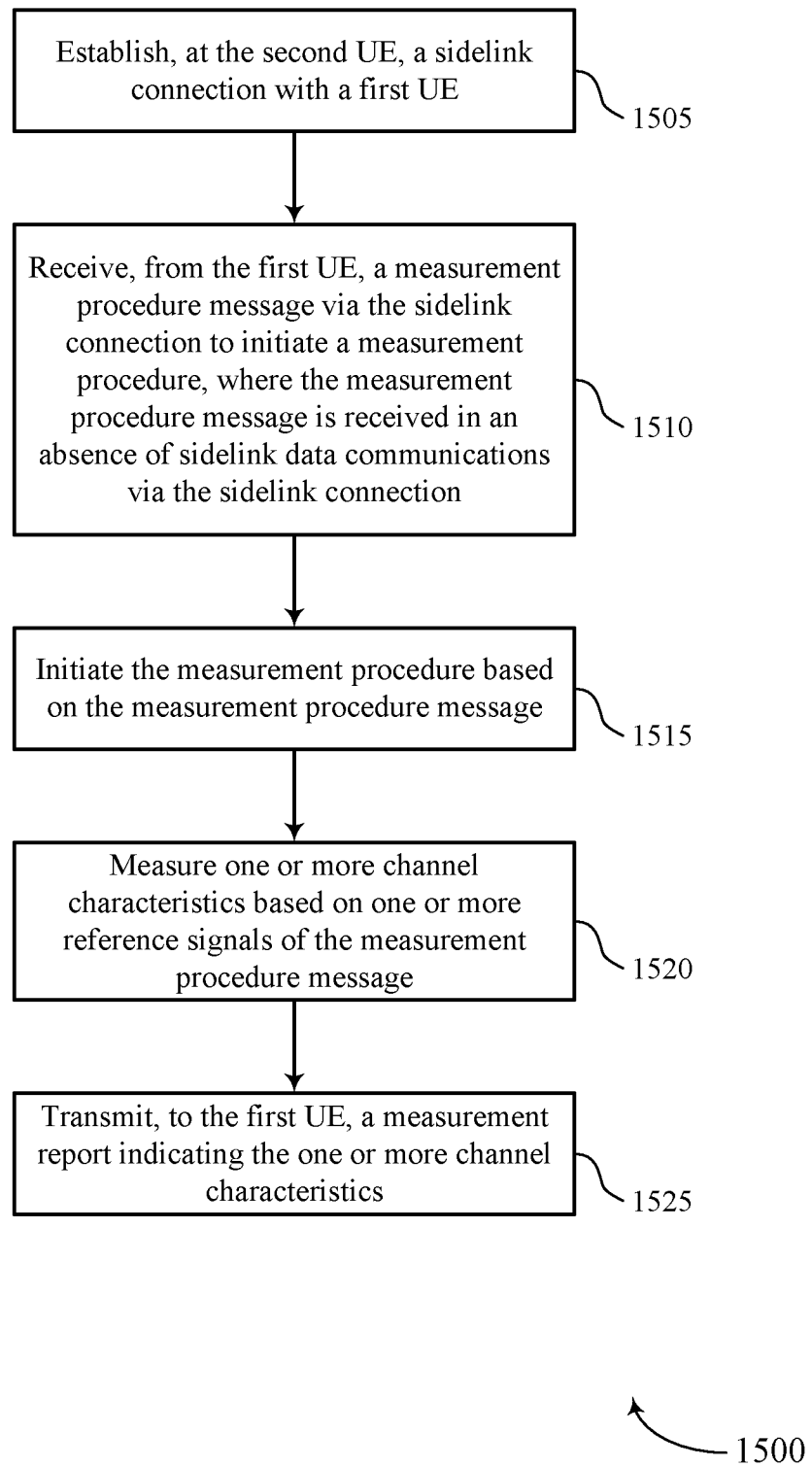

FIG. 15 shows a flowchart illustrating a method 1500 that supports radio link maintenance for sidelink wireless communications in accordance with aspects of the present disclosure. The operations of method 1500 may be implemented by a second UE 115 or its components as described herein. For example, the operations of method 1500 may be performed by a sidelink communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the second UE may establish a sidelink connection with a first UE. The operations of 1505 may be performed according to the methods described herein. In some examples, aspects of the operations of 1505 may be performed by a connection establishment manager as described with reference to FIGS. 6 through 9.

At 1510, the second UE may receive, from the first UE, a measurement procedure message via the sidelink connection to initiate a measurement procedure, where the measurement procedure message is received in an absence of sidelink data communications via the sidelink connection. The operations of 1510 may be performed according to the methods described herein. In some examples, aspects of the operations of 1510 may be performed by a radio link manager as described with reference to FIGS. 6 through 9.

At 1515, the second UE may initiate the measurement procedure based on the measurement procedure message. The operations of 1515 may be performed according to the methods described herein. In some examples, aspects of the operations of 1515 may be performed by a measurement manager as described with reference to FIGS. 6 through 9.

At 1520, the second UE may measure one or more channel characteristics based on one or more reference signals of the measurement procedure message. The operations of 1520 may be performed according to the methods described herein. In some examples, aspects of the operations of 1520 may be performed by a measurement manager as described with reference to FIGS. 6 through 9.

At 1525, the second UE may transmit, to the first UE, a measurement report indicating the one or more channel characteristics. The operations of 1525 may be performed according to the methods described herein. In some examples, aspects of the operations of 1525 may be performed by a radio link manager as described with reference to FIGS. 6 through 9.

Figure 16:
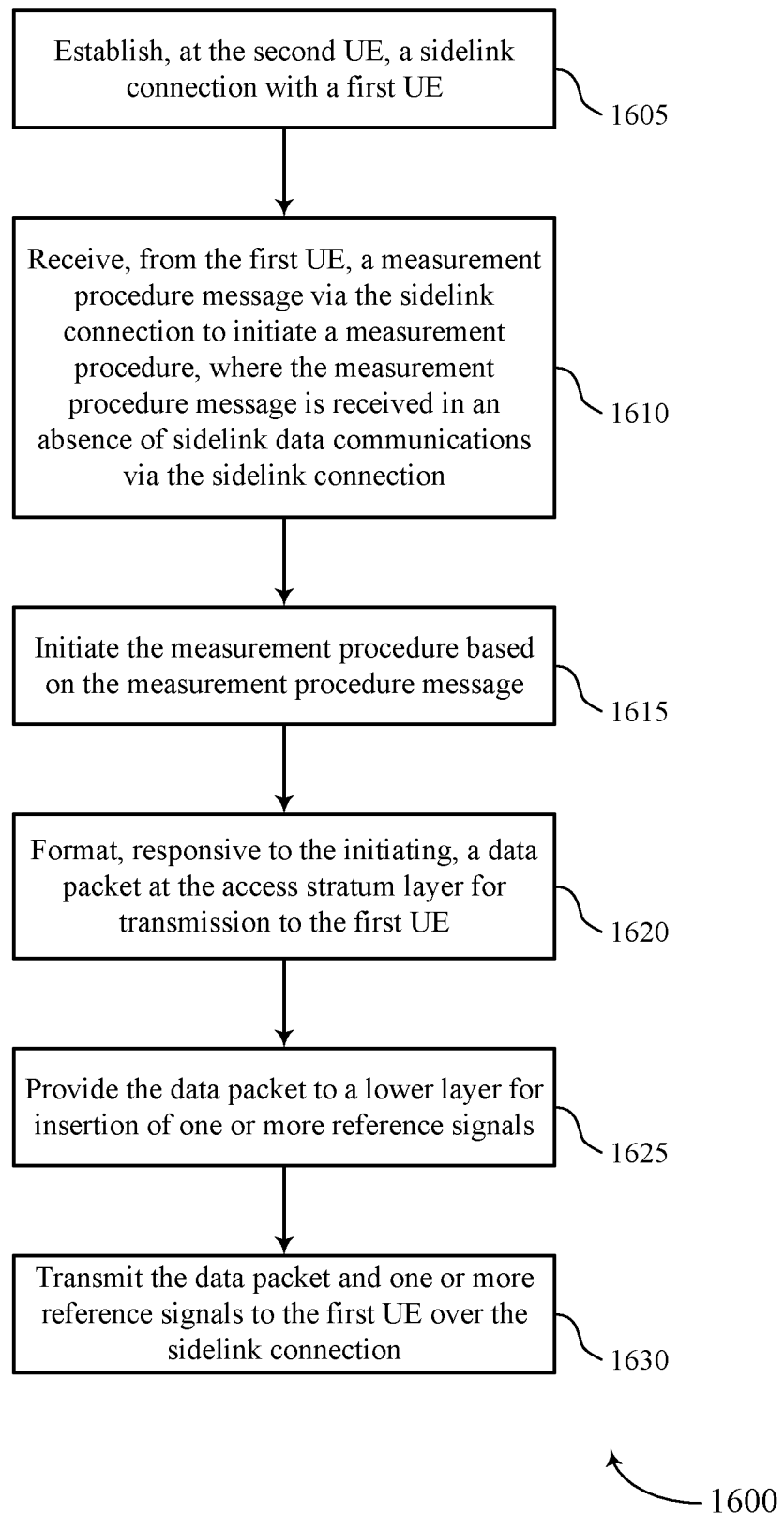

FIG. 16 shows a flowchart illustrating a method 1600 that supports radio link maintenance for sidelink wireless communications in accordance with aspects of the present disclosure. The operations of method 1600 may be implemented by a second UE 115 or its components as described herein. For example, the operations of method 1600 may be performed by a sidelink communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the second UE may establish a sidelink connection with a first UE. The operations of 1605 may be performed according to the methods described herein. In some examples, aspects of the operations of 1605 may be performed by a connection establishment manager as described with reference to FIGS. 6 through 9.

At 1610, the second UE may receive, from the first UE, a measurement procedure message via the sidelink connection to initiate a measurement procedure, where the measurement procedure message is received in an absence of sidelink data communications via the sidelink connection. The operations of 1610 may be performed according to the methods described herein. In some examples, aspects of the operations of 1610 may be performed by a radio link manager as described with reference to FIGS. 6 through 9.

At 1615, the second UE may initiate the measurement procedure based on the measurement procedure message. The operations of 1615 may be performed according to the methods described herein. In some examples, aspects of the operations of 1615 may be performed by a measurement manager as described with reference to FIGS. 6 through 9.

At 1620, the second UE may format, responsive to the initiating, a data packet at the access stratum layer for transmission to the first UE. The operations of 1620 may be performed according to the methods described herein. In some examples, aspects of the operations of 1620 may be performed by a radio link manager as described with reference to FIGS. 6 through 9.

At 1625, the second UE may provide the data packet to a lower layer for insertion of one or more reference signals. The operations of 1625 may be performed according to the methods described herein. In some examples, aspects of the operations of 1625 may be performed by a radio link manager as described with reference to FIGS. 6 through 9.

At 1630, the second UE may transmit the data packet and one or more reference signals to the first UE over the sidelink connection. The operations of 1630 may be performed according to the methods described herein. In some examples, aspects of the operations of 1630 may be performed by a radio link manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
    establishing, at the first UE, a sidelink connection with a second UE;
    initiating a status timer at the first UE responsive to completion of a first data traffic communication with the second UE, the status timer initiated at a layer of the first UE;
    detecting, based at least in part on the status timer, that an inactivity in data traffic communications with the second UE via the sidelink connection exceeds a threshold time;
    initiating, at the layer responsive to the detecting, a link maintenance procedure to maintain the sidelink connection with the second UE;
    formatting, responsive to the initiating, a data packet at the layer for transmission to the second UE;
    providing the data packet to a lower layer for insertion of one or more signals; and
    transmitting the data packet and the one or more signals to the second UE over the sidelink connection.

2. The method of claim 1, wherein the link maintenance procedure is a measurement procedure to measure one or more channel characteristics of the sidelink connection with the second UE.

3. The method of claim 1, wherein the detecting further comprises one or more of:
    determining that data traffic of the sidelink connection has been inactive for at least the threshold time;
    determining that a signal from the second UE via the sidelink connection has not been successfully received for at least the threshold time; or
    determining that a number of communication errors that have occurred in the sidelink connection meet or exceed a threshold error count.

4. The method of claim 1, further comprising:
    receiving, from the second UE, a measurement report based at least in part on the one or more signals.

5. The method of claim 1, wherein the formatting the data packet further comprises:
    formatting a layer dummy packet independently of input from one or more higher layers.

6. The method of claim 1, wherein the initiating the link maintenance procedure further comprises:
    transmitting a signal to solicit the second UE to transmit the data packet at the layer for measurement at the first UE.

7. The method of claim 1, wherein the initiating the link maintenance procedure further comprises:
    transmitting an indication to the lower layer to transmit a signal transmission to the second UE.

8. The method of claim 7, wherein the signal transmission to the second UE is a channel state information reference signal (CSI-RS) transmission using only reference signal symbols.

9. The method of claim 1, further comprising:
identifying, at the layer, new data traffic for the sidelink connection with the second UE; and
discontinuing the link maintenance procedure.

10. The method of claim 1, wherein each of the first UE and the second UE independently trigger the link maintenance procedure based on data traffic communications via the sidelink connection.

11. The method of claim 1, wherein the sidelink connection with the second UE is a unicast sidelink connection.

12. A method for wireless communication at a second user equipment (UE), comprising:
establishing, at the second UE, a sidelink connection with a first UE;
receiving, from the first UE, a link maintenance procedure message via the sidelink connection to initiate a link maintenance procedure, wherein the link maintenance procedure message is received based on an inactivity in sidelink data communications via the sidelink connection for at least a threshold time period;
initiating the link maintenance procedure based at least in part on the link maintenance procedure message; and
transmitting, responsive to the initiating the link maintenance procedure, a data packet and one or more signals to the first UE over the sidelink connection, wherein the transmitting comprises:
formatting, responsive to the initiating, the data packet at a layer for transmission to the first UE;
providing the data packet to a lower layer for insertion of the one or more signals; and
transmitting the data packet and the one or more signals to the first UE over the sidelink connection.

13. The method of claim 12, wherein the link maintenance procedure is a measurement procedure to measure one or more channel characteristics of the sidelink connection with the second UE.

14. The method of claim 13, further comprising:
measuring one or more channel characteristics based at least in part on the one or more signals of the link maintenance procedure message; and
transmitting, to the first UE, a measurement report indicating the one or more channel characteristics.

15. The method of claim 12, wherein:
the link maintenance procedure message indicates that a number of communication errors that have occurred in the sidelink connection meet or exceed a threshold error count.

16. The method of claim 12, wherein the receiving the link maintenance procedure message further comprises:
receiving, at the layer of the second UE, a dummy packet from the first UE that does not contain data that is to be provided to one or more higher layers; and
determining, based at least in part on the dummy packet, to initiate the link maintenance procedure.

17. The method of claim 12, wherein the link maintenance procedure message comprises a channel state information reference signal (CSI-RS) transmission using only reference signal symbols.

18. The method of claim 12, further comprising:
monitoring for link maintenance procedure messages from the first UE according to a predetermined periodicity;
identifying new data traffic for the sidelink connection with the first UE; and
discontinuing the monitoring for the link maintenance procedure messages.

19. The method of claim 12, wherein the establishing the sidelink connection further comprises:
receiving an indication from the first UE that the first UE is configured to trigger the link maintenance procedure for both the first UE and the second UE.

20. The method of claim 12, wherein the establishing the sidelink connection further comprises:
receiving a configuration from the first UE that indicates configuration parameters used in the link maintenance procedure, wherein the configuration parameters include one or more of a threshold time value, a threshold error counter value, or combinations thereof, to trigger the link maintenance procedure.

21. An apparatus for wireless communication at a first user equipment (UE), comprising: one or more processors, one or more memories in electronic communication with the one or more processors; and
instructions stored in the one or more memories and executable by the one or more processors processor to cause the apparatus to:
establish, at the first UE, a sidelink connection with a second UE;
initiate a status timer at the first UE responsive to completion of a first data traffic communication with the second UE, the status timer initiated at a layer of the first UE;
detect, based at least in part on the status timer, that an inactivity in data traffic communications with the second UE via the sidelink connection exceeds a threshold time;
initiate, at the layer responsive to detecting that the inactivity in data traffic communications exceeds the threshold time, a link maintenance procedure to maintain the sidelink connection with the second UE;
format, responsive to the initiating, a data packet at the layer for transmission to the second UE;
provide the data packet to a lower layer for insertion of one or more signals; and
transmit the data packet and the one or more signals to the second UE over the sidelink connection.

22. The apparatus of claim 21, wherein the link maintenance procedure is a measurement procedure to measure one or more channel characteristics of the sidelink connection with the second UE.

23. The apparatus of claim 21, wherein the instructions are further executable by the one or more processors to cause the apparatus to:
determine that data traffic of the sidelink connection has been inactive for at least the threshold time or that a signal from the second UE via the sidelink connection has not been successfully received for at least the threshold time.

24. An apparatus for wireless communication at a second user equipment (UE), comprising: one or more processors, one or more memories in electronic communication with the one or more processors; and
instructions stored in the one or more memories and executable by the one or more processors to cause the apparatus to:
establish, at the second UE, a sidelink connection with a first UE;
receive, from the first UE, a link maintenance procedure message via the sidelink connection to initiate a link maintenance procedure, wherein the link maintenance procedure message is received based on an inactivity in sidelink data communications via the sidelink connection for at least a threshold time period;

initiate the link maintenance procedure based at least in part on the link maintenance procedure message; and transmit, responsive to the initiating the link maintenance procedure, a data packet and one or more reference signals to the first UE over the sidelink connection, wherein the instructions that cause the apparatus to transmit the data packet are further executable by the one or more processors to cause the apparatus to:

format, responsive to the initiating, the data packet at a layer for transmission to the first UE;

provide the data packet to a lower layer for insertion of the one or more signals; and transmit the data packet and the one or more signals to the first UE over the sidelink connection.

25. The apparatus of claim 24, wherein the link maintenance procedure is a measurement procedure to measure one or more channel characteristics of the sidelink connection with the second UE.

26. The apparatus of claim 25, wherein the instructions are further executable by the one or more processors to cause the apparatus to:

measure one or more channel characteristics based at least in part on the one or more signals of the link maintenance procedure message; and transmit, to the first UE, a measurement report indicating the one or more channel characteristics.

27. The apparatus of claim 24, wherein the instructions are further executable by the one or more processors to cause the apparatus to:

receive, at the layer of the second UE, a dummy packet from the first UE that does not contain data that is to be provided to one or more higher layers; and determine, based at least in part on the dummy packet, to initiate the link maintenance procedure.

\* \* \* \* \*